United States Patent [19]
Hagemark et al.

[11] Patent Number: 6,070,002
[45] Date of Patent: *May 30, 2000

[54] SYSTEM SOFTWARE FOR USE IN A GRAPHICS COMPUTER SYSTEM HAVING A SHARED SYSTEM MEMORY

[75] Inventors: Bent Hagemark, Santa Clara; Angela Lai, Mountain View; Kevin Meier, Redwood City; Jonathan Wesener, Fremont; Brian Beach, Santa Cruz; John Wiltse Carpenter, San Francisco, all of Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,419

[22] Filed: Sep. 13, 1996

[51] Int. Cl.$^7$ .................................................. G06F 17/00
[52] U.S. Cl. ......................................................... 395/200.8
[58] Field of Search ................................ 395/200.8, 474, 395/480, 436, 497.04, 512, 506

[56] References Cited

U.S. PATENT DOCUMENTS

| | | | |
|---|---|---|---|
| 5,054,360 | 10/1991 | Lisle et al. ................................. | 84/645 |
| 5,212,742 | 5/1993 | Normile et al. ......................... | 382/234 |
| 5,373,327 | 12/1994 | Mcgee et al. ............................ | 348/645 |
| 5,467,459 | 11/1995 | Alexander et al. ................ | 395/497.04 |
| 5,625,829 | 4/1997 | Gephart et al. .......................... | 395/306 |

OTHER PUBLICATIONS

Nowatzyk et al. "The S3.mp Scalable Shared Memory Multiprocessor"; IEEE, 1994.

Bit 3, computer Corporation, Data Sheet for Model 608; http://ww.bit3.com/ds608.html, Dec. 18, 1996.

Chase et al., "Some Issues For Single Address Space Systems"; IEEE, 1993.

Norton, Mark J., "A Dockable Digital Disk Recorder," in *Moving Images: Meeting the Challenges*, 137th SMPTE Technical Conference and World Media Expo, pp. 260–269, (Sep., 1995).

"The MPACT™ Media Engine: A Completely New Approach to Multimedia Integration," pp. 1–6, (Chromatic Research, Inc., ©1995).

*Primary Examiner*—Ellis B. Ramirez
*Attorney, Agent, or Firm*—Sterne, Kessler, Goldstein & Fox P.L.L.C.

[57] ABSTRACT

A computer system having a shared system memory, and system software in the computer system, are described herein. One or more user applications execute in the computer system. The computer system has a general purpose, shared system memory that is used for all processing, including video input/output operations and image conversion operations. The computer system also has a multimedia access and control module (MACM), which is the input/output interface between the computer system and the external world. In operation, the MACM receives, at one of its video input ports, video data comprising a video image (such as a frame or a field). The MACM stores the video image in a first buffer contained in a first buffer pool of the system memory. The first buffer pool was previously created by a user application. The user application previously associated the first buffer pool with the MACM's video input port. A video imaging and compression module (VICM) performs image conversion operations. Each user application creates one or more converter contexts of the VICM. Each converter context is capable of performing an image conversion operation. In operation, a converter context of the VICM performs an image conversion operation on the video image stored in the first buffer. Then, the converter context stores the results of the image conversion operation in a second buffer contained in a second buffer pool of the system memory. The second buffer pool is also associated with the user application.

15 Claims, 17 Drawing Sheets

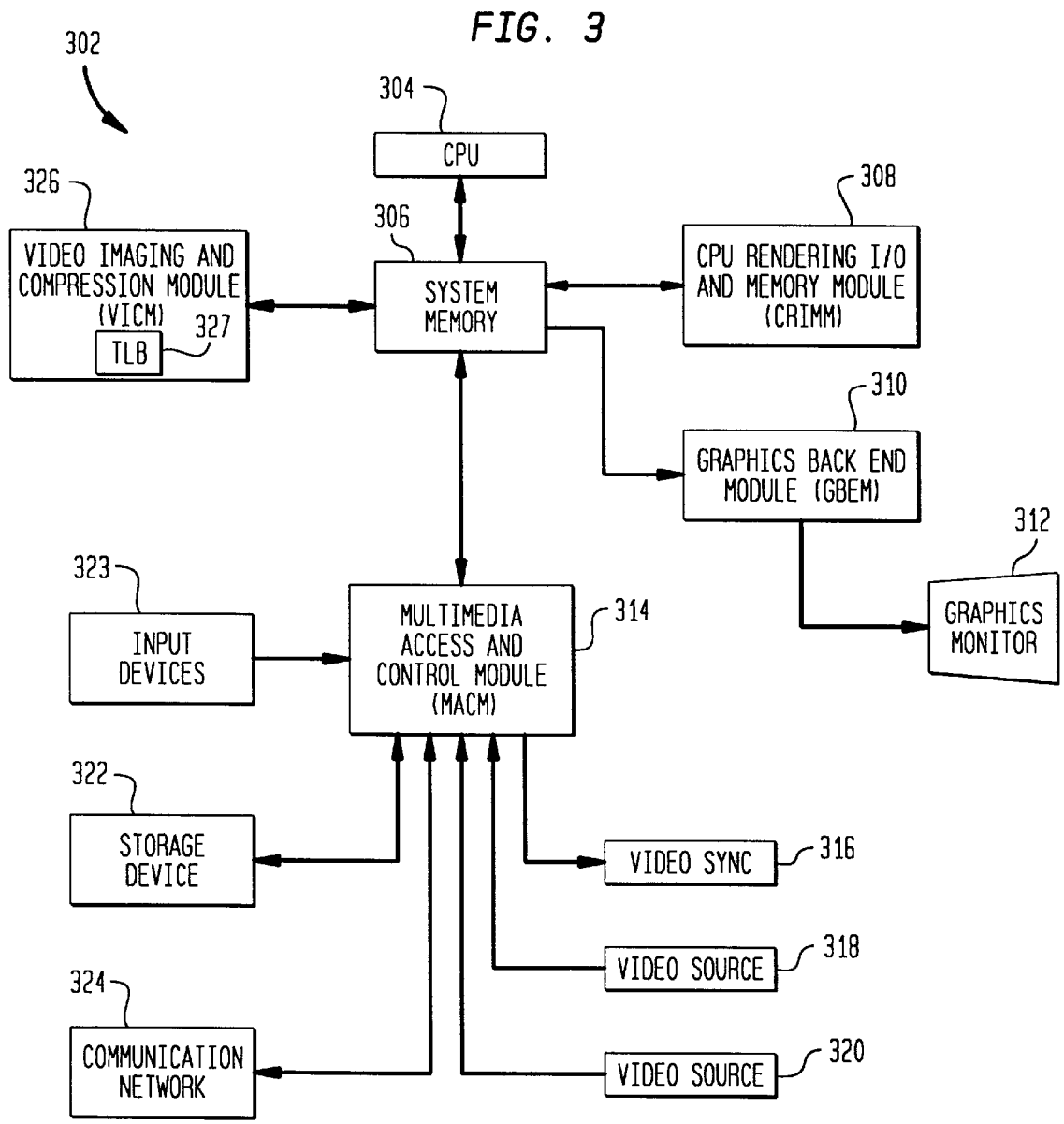

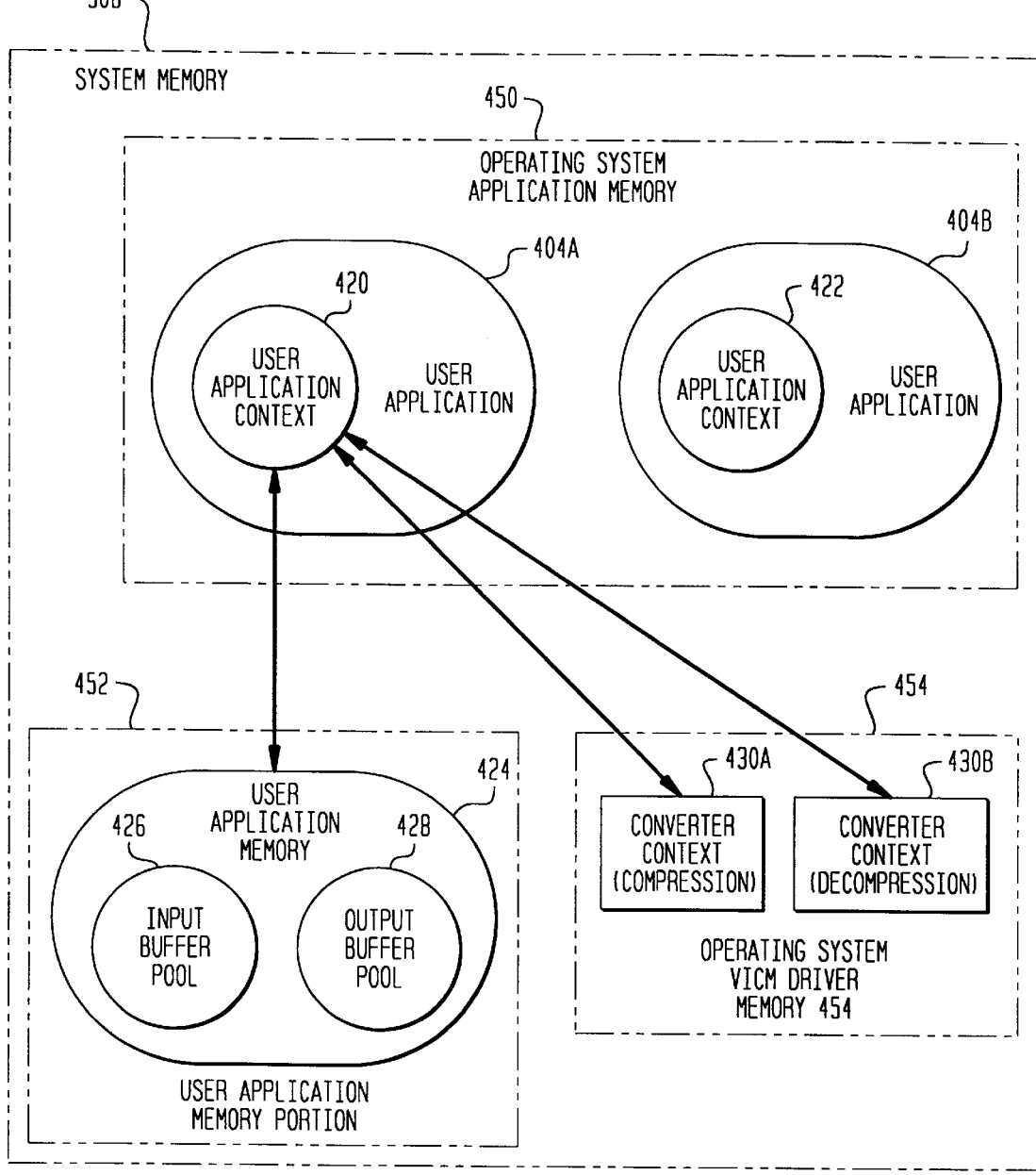

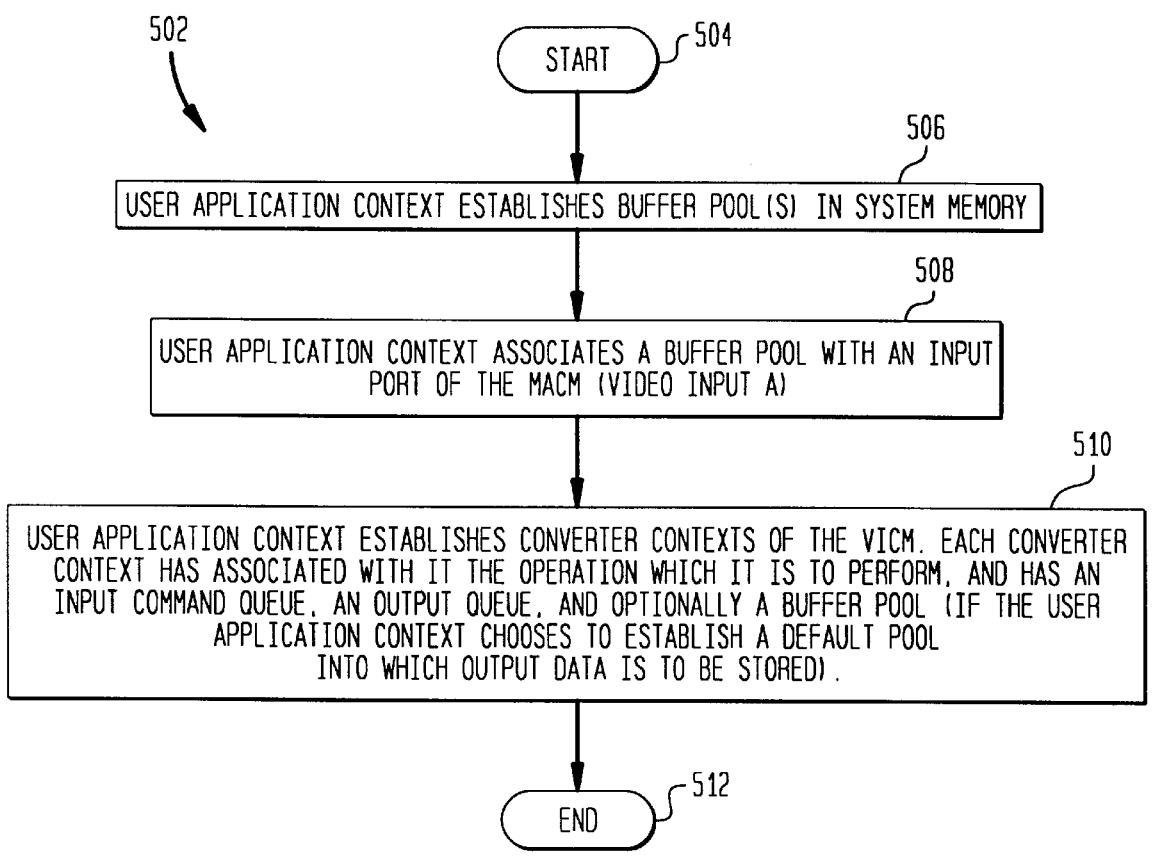

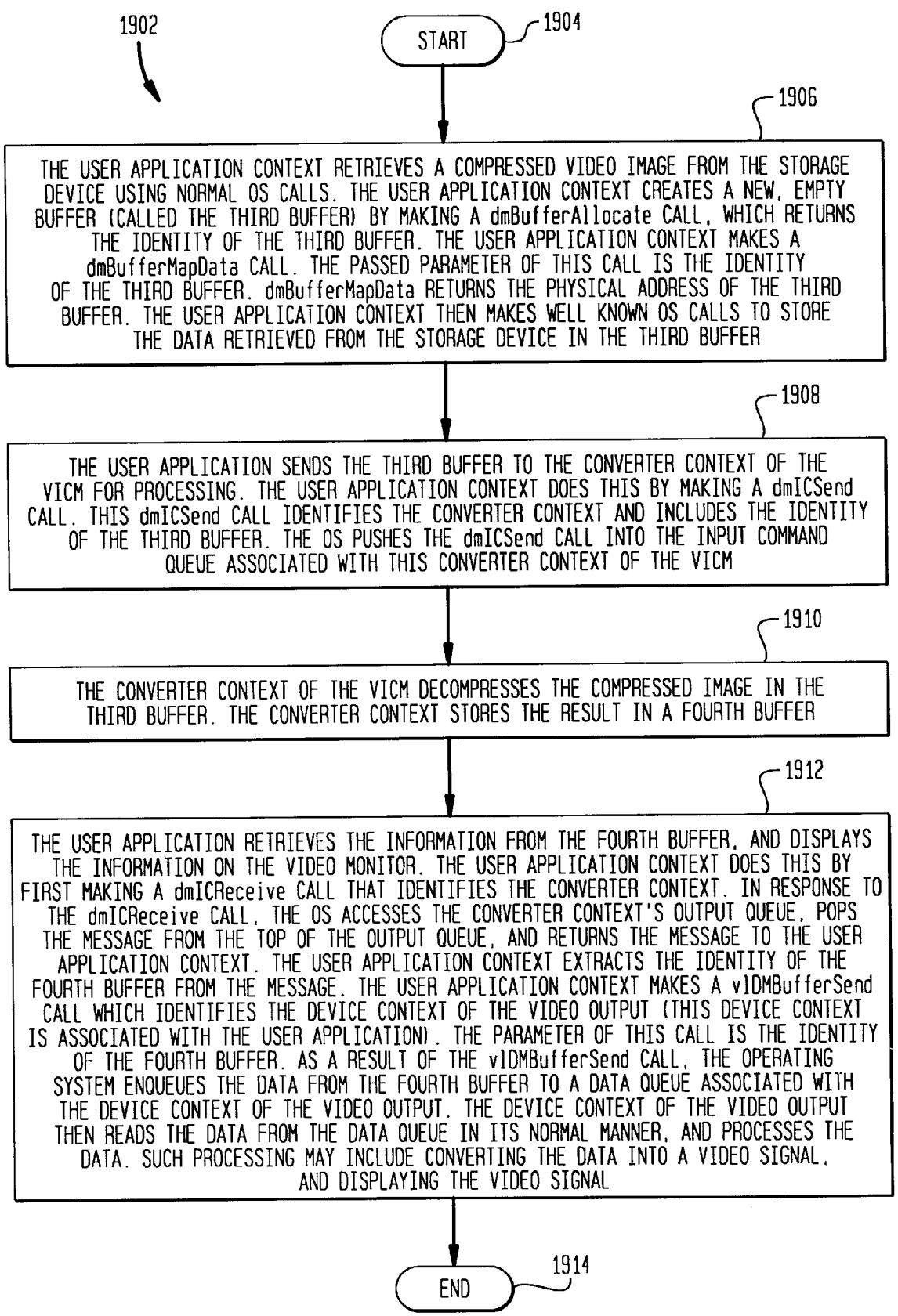

SYSTEM SOFTWARE FOR USE IN A GRAPHICS COMPUTER SYSTEM HAVING A SHARED SYSTEM MEMORY

CROSS-REFERENCE TO OTHER APPLICATIONS

The following applications of common assignee are believed to have an effective filing date identical with that of the present application.

"Computer System Architecture Having Dynamic Memory Allocation For Graphics," Ser. No. 08/713,779 (pending), incorporated herein by reference in its entirety.

"Compression and Decompression Scheme Performed on Shared Workstation Memory By Media Coprocessor," U.S. Pat. No. 5,768,445, incorporated herein by reference in its entirety.

BACKGROUND OF THE INVENTION

1. Field of the Invention

The present invention relates generally to a computer system having a shared system memory, and more particularly to system software in a computer system having a shared system memory.

2. Related Art

FIG. 1 is a block diagram of a conventional computer system 102. The computer system 102 is "bus centric," in that all components are connected to and communicate with each other via a bus 116. In particular, a CPU 104 (central processing unit), system memory 106, graphics rendering hardware 108, and an I/O (input/output) interface 118 are connected to a bus 116, and communicate with each other via the bus 116.

The system memory 106 is the main memory in the computer system 102, and it is implemented as random access memory (RAM). However, the system memory 106 is not the only RAM in the computer system 102. The computer system 102 also includes a frame buffer 110, which is implemented using VRAM (video random access memory). The frame buffer 110 is dedicated for use by the rendering hardware 108. In operation, the rendering hardware 108 performs graphical operations and renders a graphical image to the frame buffer 110. A graphics back end (GBE) 112 displays the graphical image on a graphics monitor 114.

The computer system 102 also includes a video buffer RAM 122 that is used for direct communication of video data to the compression module 124 (which may represent a video compression computer card, for example). There is also a compression RAM 123 that is used for compression operations. In operation, a video source 120 (such as a video camera) generates a video signal. The bandwidth of the video signal is approximately 20 Mbytes/second. Typically, "consumers" or "users" of the video signal have a smaller bandwidth. For example, the storage device 126 (such as a disk drive) usually has a bandwidth of 2–4 Mbytes/second. A communication network (not shown) usually has a bandwidth of approximately 1 Mbyte/second. Thus, it is necessary to compress the video signal.

Accordingly, the video signal is stored in the video buffer RAM 122. The compression module 124 compresses the video data stored in the video buffer RAM 122 using the compression RAM 123 to hold compression task state information such as inter-frame reference data, and then transfers the compressed video data to the I/O interface 118. The I/O interface 118 sends the compressed video data to an external device, such as a storage device 126 or to a destination over a communication network (not shown). In other systems, data is transferred directly from the compression module 124 to the storage device 126 or other external device.

Thus, the computer system 102 has multiple RAMs: the system memory 106, the frame buffer 110, the video buffer RAM 122, and the compression RAM 123. It is costly to have multiple RAMs. This cost manifests itself in increased system cost (since more RAMs cost more money) and increased system size (since more RAMs take up more space). Thus, the conventional computer system 102 is not ideal since it requires multiple RAMs.

The system memory 106 is general purpose, but the frame buffer 110, the video buffer RAM 122, and the compression RAM 123 are dedicated to specific functions. The frame buffer 110 can be used only for graphics operations, and the video buffer RAM 122 and compression RAM 123 can be used only for compression operations. Thus, a significant portion of the RAM in the computer system 102 can be used only for particular functions. Accordingly, the conventional computer system 102 is not ideal because its RAMs are not flexible.

The inflexibility of the compression RAM 122 extends to the entire video compression path. The compression module 124 and compression RAM 122 that comprise the video compression path are capable of operating with a single video signal. Thus, the compression path of the conventional computer system 102 is inflexible because it cannot simultaneously work with multiple video signals.

Also, the compression module 124 and compression RAM 122 can only work with one video signal type. The type of video signal that the compression module 124 and compression RAM 122 can work with is determined when the computer system 102 is manufactured. Thus, the compression path of the conventional computer system 102 is inflexible because it cannot work with multiple types of video signals.

This latter inflexibility of the compression path results from its manner of operation. As shown in FIG. 2, processing of a video signal by the conventional computer system 102 is performed entirely by hardware 208 (the hardware 208 includes the video buffer RAM 122, the compression RAM 123, compression module 124, and I/O interface 118). Such processing is represented by path 212, which does not extend into the operating system layer 206 or the user application layer 204. Since it is performed entirely by hardware 208, the video compression function is essentially "hardwired" into the computer system 102. Thus, the compression device 124 and other related hardware have limited applicability because they are hardwired to and embedded in the video input/output path.

SUMMARY OF THE INVENTION

Briefly stated, the present invention is directed to a computer system having a shared system memory, and to system software in the computer system. One or more user applications execute in the computer system. Each user application has one or more device contexts.

The computer system has a general purpose, shared system memory that is used for all processing, including video input/output operations and image conversion operations. The computer system also has a multimedia access and control module (MACM), which is the input/output interface between the computer system and the external world. In operation, the MACM receives, at one of its video input ports, video data comprising a video image (such as a frame or a field). The MACM stores the video image in a first buffer contained in a first buffer pool of the system memory. The first buffer pool was previously created by a user application. The user application previously associated the first buffer pool with the MACM's video input port.

A video imaging and compression module (VICM) performs image conversion operations. Each user application creates one or more converter contexts of the VICM. Each converter context is capable of performing an image conversion operation. In operation, a converter context of the VICM performs an image conversion operation on the video image stored in the first buffer. Then, the converter context stores the results of the image conversion operation in a second buffer contained in a second buffer pool of the system memory. The second buffer pool is also associated with the user application.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 3 is a block diagram of a computer system according to a preferred embodiment of the present invention;

FIG. 4B illustrates the interaction between user applications, user application memory, and converter contexts;

FIGS. 5, 10, 11, 12, 13, 14, 16, 17, and 19 are flowcharts representing the preferred operation of the present invention;

FIG. 19 is a flowchart showing the operation of the invention while traversing the path from the storage device to a video output/sink.

DETAILED DESCRIPTION OF THE PREFERRED EMBODIMENTS

Overview of the Present Invention

Referring to FIG. 3, the present invention is directed to a computer system 302 having a shared system memory 306. The invention is also directed to the system software that operates in the computer system 302.

The system memory 306 is used for all processing, including CPU (central processing unit) processing and input/output processing (including video input and output processing). The system memory 306 is also used for graphics processing, and takes the place of a frame buffer. The system memory 306 is further used for image conversion processing (including compression and decompression processing), and takes the place of a video buffer RAM and a compression RAM.

The system memory 306 is implemented as RAM (random access memory). Preferably, the system memory 306 is at least 64 Mbytes, but other configurations are possible.

The system memory 306 is general purpose. It is not dedicated for any particular function. The computer system 302 does not include any RAM dedicated for use with graphics processing, video I/O, or image conversion processing. Consequently, the computer system 302 is less costly (both in terms of size and financial cost) than conventional computer systems having general purpose and dedicated RAMs.

Figure 1:
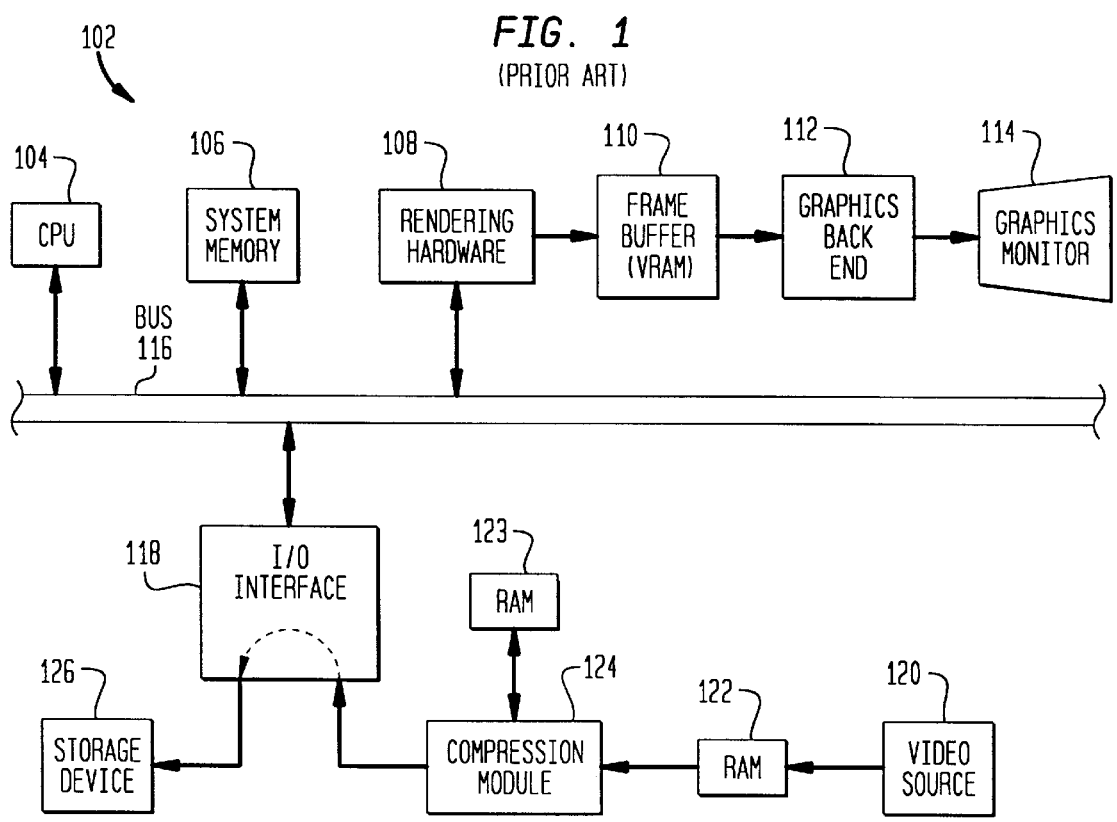
FIG. 1 is a block diagram of a conventional computer system.
Figure 2:
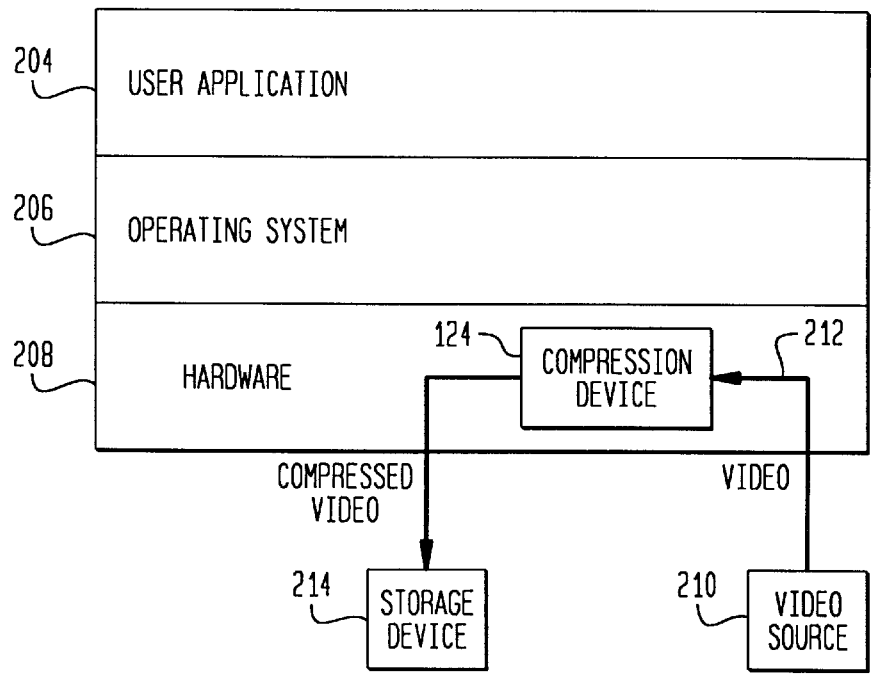
FIG. 2 illustrates a conventional system software architecture.

The computer system 302 also includes a central processing unit (CPU) 304, and a video imaging and compression engine or module (VICM) 326. The VICM 326 performs image conversion functions, which are functions that convert at least a part of an image from a first form to a second form. Image conversion functions include video imaging and compression functions, such as data compression, data decompression, color space conversion, etc. The VICM 326 is connected to system memory 306. This differs from conventional computer systems, where the data compression/decompression modules are not connected to system memory (see FIG. 1, for example).

The computer system 302 also includes a CPU rendering I/O and memory engine or module (CRIMM) 308. The CRIMM 308 controls the system memory 306. The CRIMM 308 also performs graphical operations, such as rendering operations, and is also herein called a graphics renderer. The CRIMM 308 is connected to the system memory 306.

The computer system 302 further includes a graphics back end module (GBEM) 310, which is connected to a graphics monitor 312. The GBEM 310 retrieves graphics data from the frame buffers formed in the system memory 306, and displays the graphics data on the graphics monitor 312.

The CRIMM 308 is not directly connected to the GBEM 310. This is unlike conventional computer systems, where the graphics rendering engine is connected to the graphics back end via a frame buffer, which is dedicated to graphics operations (see FIG. 1). In the present invention, the CRIMM 308 is connected to the GBEM 310 via system memory 306, which is general purpose memory.

The computer system 302 further includes a multimedia access and control engine or module (MACM) 314, which is connected to system memory 306. The MACM 314 operates as the input/output (I/O) interface between the computer system 302 and the external world. Connected to the MACM 314 are one or more video sinks (also called video outputs), such as video sink 316. As used herein, the term video sink refers to a device which receives video data from the computer system 302. Examples of video sinks include video monitors, video recorders, video switches, broadcast equipment, etc. Also connected to the MACM 314 are one or more video sources (such as video cameras), such as video sources 318 and 320, a storage device 322 (such as a disk drive), a communication network 324 (such as the Internet), and input devices 323 (such as a keyboard and mouse).

As depicted in FIG. 3, the CPU 304, CRIMM 308, GBEM 310, MACM 314, VICM 326 are connected to and communicate with each other via the system memory 306. Accordingly, the computer system 302 of the present invention is "system memory centric." This is in contrast to conventional computer systems, such as that shown in FIG. 1, which are bus centric.

The computer system 302 is described in greater detail in U.S. application entitled "Computer System Architecture Having Dynamic Memory Allocation For Graphics," referenced above.

Overview of the System Software of the Present Invention

Figure 4A:
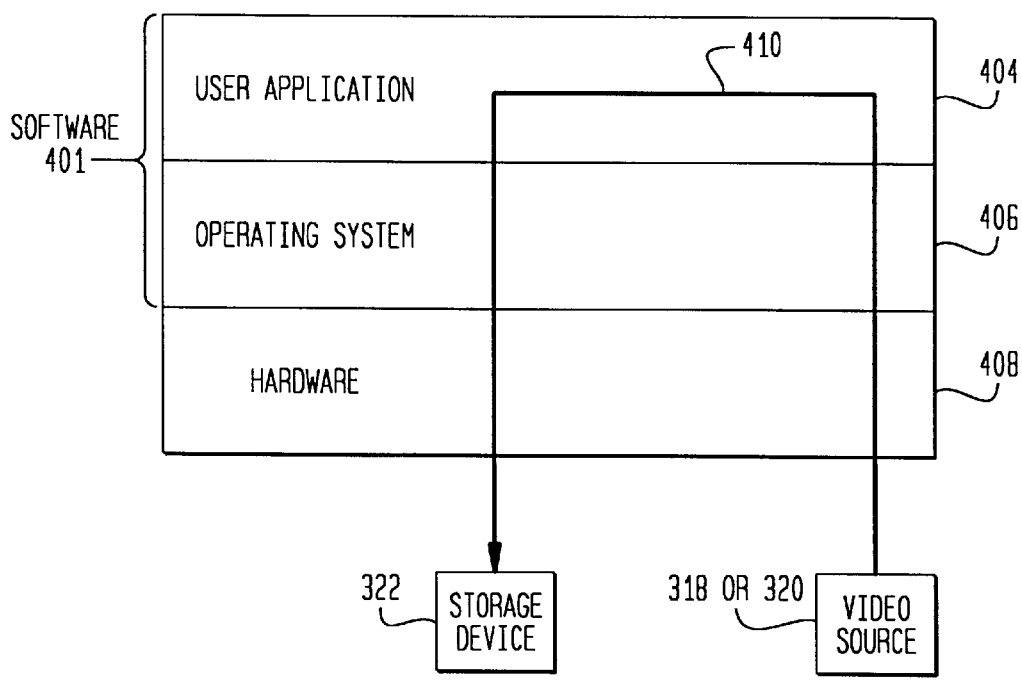
FIG. 4A illustrates a system software architecture according to a preferred embodiment of the present invention.

FIG. 4A generally depicts the system software architecture 302 of the present invention. According to the present invention, user applications 404 have the ability to direct the manipulation of real-time video. More particularly, user applications 404 have the ability to direct the per image flow of real-time video data between input/output processing (including video input and output processing), image conversion processing (including compression and decompression processing), and graphics processing. This is in addition to functions that user applications 404 typically participate in and/or control. As represented by path 410, for example, operations that take place in the path from the video source 318, 320 to the storage device 322 involve user applications 404, the operating system 406, and hardware 408. Such operations at least include input/output processing, image conversion processing, and graphics processing.

Referring to FIG. 4B, there may be multiple user applications 404A, 404B executing simultaneously in the computer system 302. User applications 404 are maintained in an operating system application memory 450 that is within the system memory 306.

Each user application 404 includes a user application context 420, 422. For the purposes of the present invention, user applications and user application contexts are the same. Thus, the two terms are used interchangeably herein.

Each user application, such as user application 404A, operates with an exclusive portion of system memory 306, called the user application memory 424 (no other user applications use this portion of system memory 306). The user application memory 424 may include an input buffer pool 426 and an output buffer pool 428, for example. More generally, the user application memory 424 may include any number of buffer pools each of which may be used for input from and/or output to a device producing or accepting real-time video image data. Such devices include video I/O, compression/decompression, and graphics rendering and display. The user application memory 424 is part of a user application memory portion 452 of system memory 306.

Contained in each buffer pool 426, 428 are one or more digital media (DM) buffers. Each buffer stores data for a video image. As used herein, the term video image refers to any video image unit, such as a frame, field (each frame includes two fields), etc. Preferably, a frame is 640 pixels by 480 pixels (such that a field is 640×240) at 30 frames/second. Alternatively, a frame is 768×576 (and a field is 768×288) at 25 frames/second. The present invention preferably supports various video standards, such as NTSC used in the United States and Japan, and PAL used in Europe. However, other frame formats and standards may alternatively be used.

The unit of storage in the system memory 306 is called a tile. A tile is preferably 64 Kbytes, but other tile sizes are possible. The size of a buffer may be 1 Mbytes or larger. Thus, typically a buffer is formed from a plurality of tiles. The number of tiles needed to form a buffer is equal to:

(buffer size)/(tile size)

The buffer size, tile size, and thus the number of tiles needed to form a buffer are implementation dependent.

Each user application, such as user application 404A, operates with one or more converter contexts, such as converter contexts 430A, 430B. The converter contexts 430 are maintained in an operating system VICM driver memory 454, which is part of system memory 306. The converter contexts created by one user application cannot be used by other user applications.

Each converter context 430 is a logical representation of the VICM 326. Each converter context 430 is capable of performing one of the imaging conversion functions from the set of functions supported by the VICM 326. Each user application 404 creates a converter context 430 for each imaging conversion function that it requires. For example, suppose that the user application 404A needs to be able to perform both data compression and decompression. In this case, the user application 404A creates a converter context 430A for compression, and a converter context 430B for decompression. Converter contexts are described in greater detail below.

Figure 18:
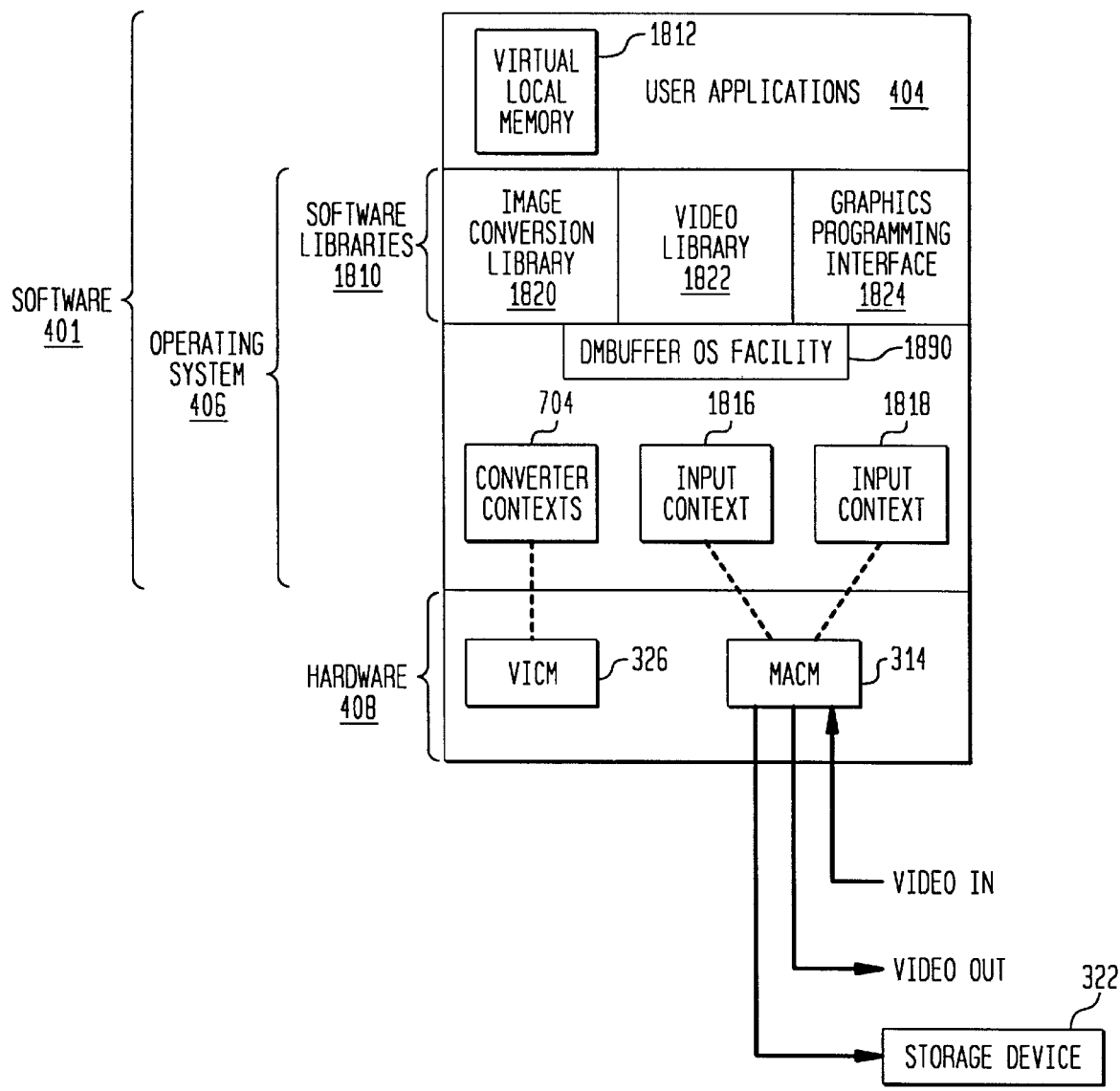
FIG. 18 illustrates the system software architecture of FIG. 4A in greater detail.

FIG. 18 illustrates the computer system 302 of the present invention in greater detail. The software 401 of the present invention includes user applications 404, software libraries 1810, and the operating system 406. The operating system 406 is preferably based on the UNIX operating system (as modified to operate as discussed herein). The operating system 406 could alternatively be based on other well known general purpose operating systems. The software libraries 1810 can be viewed as being partially part of the operating system 406, and partially being a distinct layer between the user applications 404 and the operating system 406.

In practice, the software libraries 1810, operating system 406, and hardware 408 are typically provided by the computer manufacturer, and the user applications 404 are typically provided by the user of the computer. However, some user applications 404 may also be provided by the computer manufacturer.

The software libraries 1810 include an image conversion library 1820, a video library 1822, and a graphics programming interface 1824. The image conversion library 1820 includes functions that, when called, cause converter contexts of the VICM 326 to perform video imaging functions, such as data compression and decompression. The video library 1822 includes functions for manipulating, accessing, and otherwise interacting with system memory 306 and DM buffers in the system memory 306.

The graphics programming interface 1824 includes functions for performing graphical operations. The graphics programming interface 1824 is preferably compatible with OpenGL, as extended to operate with DM buffers. OpenGL is well known and is described in many publicly available documents, such as Neider, Davis, and Woo, *OpenGL Programming Guide*, Addison Wesley, 1995, and OpenGL Architecture Review Board, *OpenGL Reference Manual*, Addison Wesley, 1995, incorporated herein by reference in their entireties. It should be understood, however, that the present invention is not limited to this embodiment. The present invention is adapted and intended to work with other non-OpenGL, interactive computer graphics systems.

The operating system 406 includes a DM buffer operating system facility 1890 which provides facilities for enabling the libraries 1810 to access, manipulate, and otherwise interact with DM buffers in system memory 306. Components in the computer system, such as the user applications 404, the VICM 326, the MACM 314, and the CRIMM 308, interact with each other via the DM buffers in system memory 306. These components may not be capable of directly interacting with each other. However, they all know how to interact with DM buffers. Thus, they interact with each other by interacting with the DM buffers. For example, one component may save data in a DM buffer. Another component may process the data in the DM buffer. Thus, these two components have effectively interacted with each other by interacting with the same DM buffer.

The software libraries 1810 present APIs (application programming interfaces) to the user applications 404. The user applications 404 access the functions, features, and capabilities of the software libraries 1810 via these APIs.

Each user application 404 must create its user application memory and its converter contexts. This is done by calls to the software libraries 1810 during an initialization phase, which is discussed in the following section.

User Application Initialization

FIG. 5 is a flowchart 502 depicting the operations that a user application performs during an initialization phase. The user application must perform the steps of flowchart 502 before it can access converter contexts. Flowchart 502 begins with step 504, where control immediately passes to step 506.

Figure 6:
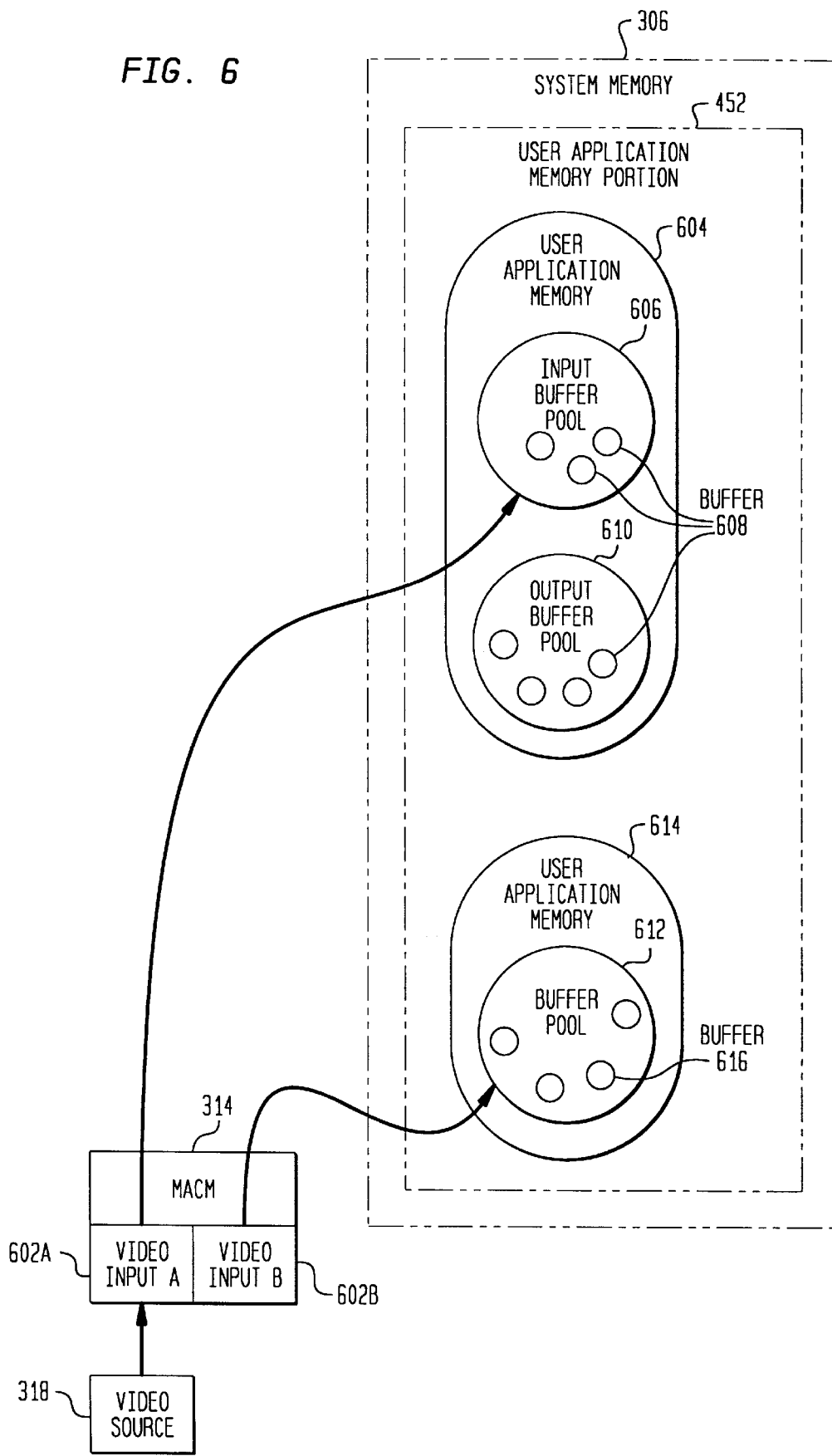
FIG. 6 illustrates the association of video inputs of the MACM to input buffer pools.

In step 506, the user application establishes its user application memory 604 in the user application memory portion 452 of the system memory 306 (see the example shown in FIG. 6). The user application memory 604 may have a plurality of buffer pools, such as buffer pools 606 and 610. These are called the input buffer pool 606 and the output buffer pool 610, respectively, for reference purposes. Each buffer pool 606, 610 may include a plurality of DM buffers 608. The user application creates and allocates buffer pools and DM buffers within buffer pools by making calls to functions in the software libraries 1810. The functions, when executed, interact with the operating system 406, the CRIMM 308, and the system memory 306 to establish the user application memory 604 in the system memory 306, to create buffer pools 606, 610, and to allocate memory for buffers 608.

Some user applications may wish to receive video data from a video source 318, 320 connected to an input port of the MACM 314. According to the present invention, a user application which wants this capability must register a portion of its user application memory 604 (i.e., one of its buffer pools 606 or 610) with the MACM 314. More particularly, the user application must associate or link one of its buffer pools 606 or 610 with the input port of the MACM 314 into which the desired video signal is to be received.

For example, suppose that a user application wishes to receive the video signal from the video source 318 connected to video input A 602A of the MACM 314. If this is the case, then the user application associates its input buffer port 606 with video input A 602A of the MACM 314. Thereafter, the MACM 314 stores all video images received on video input A 602A in buffers in the input buffer port 606. The user application associates a buffer pool with a video input of the MACM 314 in step 508 by making calls to functions provided by the software libraries 1810. The functions, when executed, interact with the operating system 406, the MACM 314, and the system memory 306 to associate the user application's buffer pool with a video input of the MACM 314.

Preferably, the MACM 314 has multiple video inputs and multiple video outputs. In one embodiment, the MACM 314 has two video inputs and one video output. In other embodiments, the MACM 314 has other than two video inputs and other than one video output. Accordingly, the MACM 314 is capable of receiving multiple video signals. Different user applications can associate their buffer pools with these video inputs (although preferably only one user application can be associated with each video input). Also, the same user application can associate its buffer pool(s) with multiple video inputs.

Figure 7:
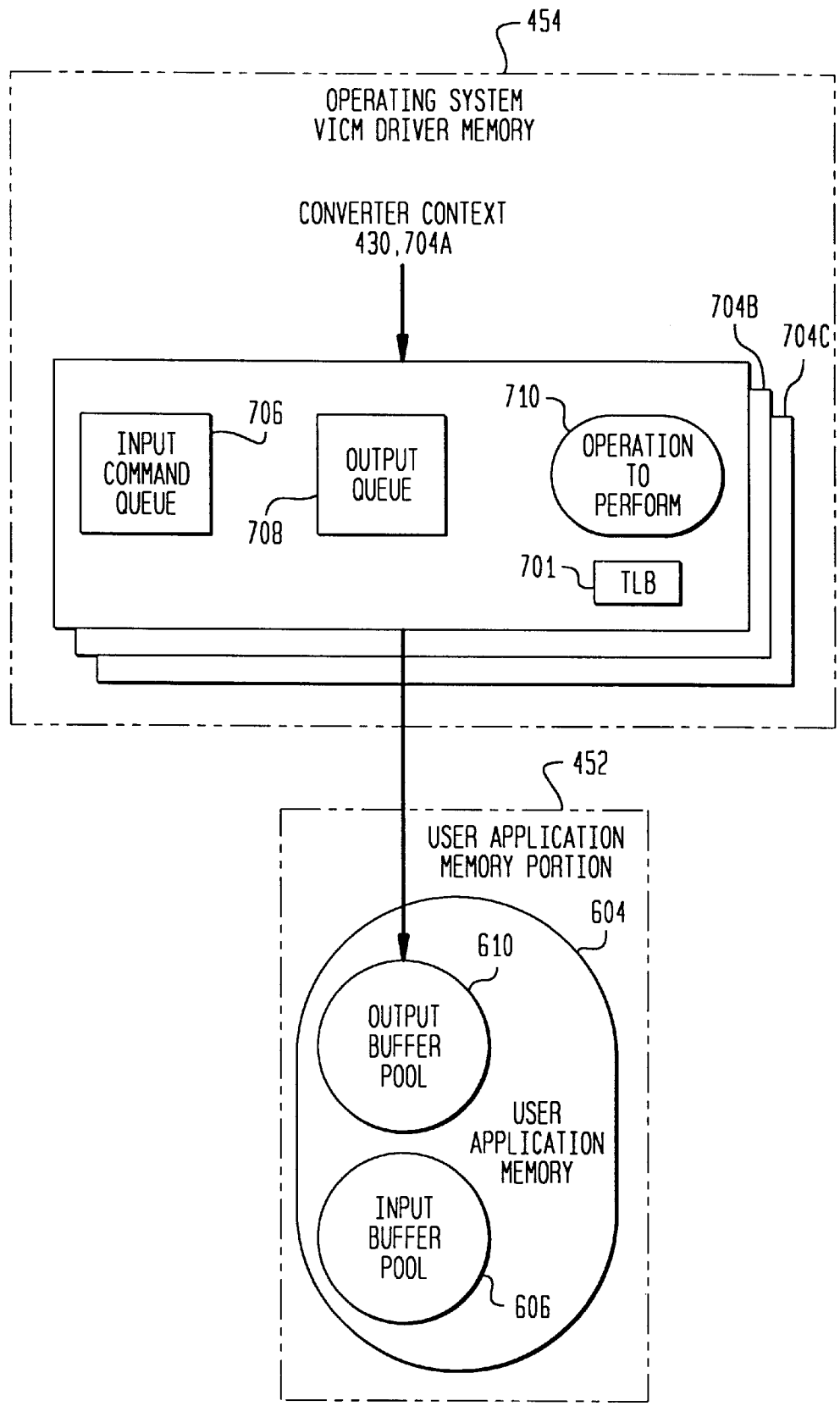
FIG. 7 is a block diagram of a converter context.

In step 510, the user application creates in the operating system VICM driver memory 454 a converter context 704 for each image conversion operation which it needs to perform (see the example in FIG. 7; converter contexts are also generally represented as 430 in FIG. 4B). Each converter context 704 is a logical representation of the VICM 326 established by the operating system 406 in combination with the VICM 326 (see FIG. 18). Each converter context 704 is capable of performing one of the imaging conversion functions from the set of functions supported by the VICM 326. This function is represented by "operation to perform 710" in FIG. 7.

In addition to the operation to perform 710, each converter context 704 includes an input command queue 706 and an output queue 708. When the user application wishes the converter context 704 to perform an operation, the user application makes a dmICSend call (which is part of the image conversion library 1820). The dmICSend call (or a message encompassing the dmICSend call) is placed in the input command queue 706 and processed on preferably a first-in first-out basis.

When the converter context 704 completes its processing of a dmICSend call, the converter context 704 places a message in the output queue 708 (the content of this message is described below). The user application retrieves this message from the output queue 708 by making a dmICReceive call (which is part of the image conversion library 1820).

Processing of flowchart 502 is complete after step 510 is performed, as indicated by step 512.

It will be useful at this point to further describe the VICM 326. As discussed above, the VICM 326 does not include a dedicated RAM memory. Instead, the VICM 326 uses the shared system memory 306. At any time, the portions of the system memory 306 that are being used by the VICM 326 are addressed by pointers stored in a physical TLB 327 (translation lookaside buffer) in the VICM 326.

Each converter context 704 includes a logical TLB 701. The logical TLB 701 stores the pointers to portions in system memory 306 that are accessible by the associated converter context 704. When a converter context 704 becomes active, the pointers in its logical TLB 701 are transferred to the physical TLB 327 by the operating system 406. Thus, it is possible to cycle through and use different areas of system memory 306 by changing the converter context.

Figure 8:
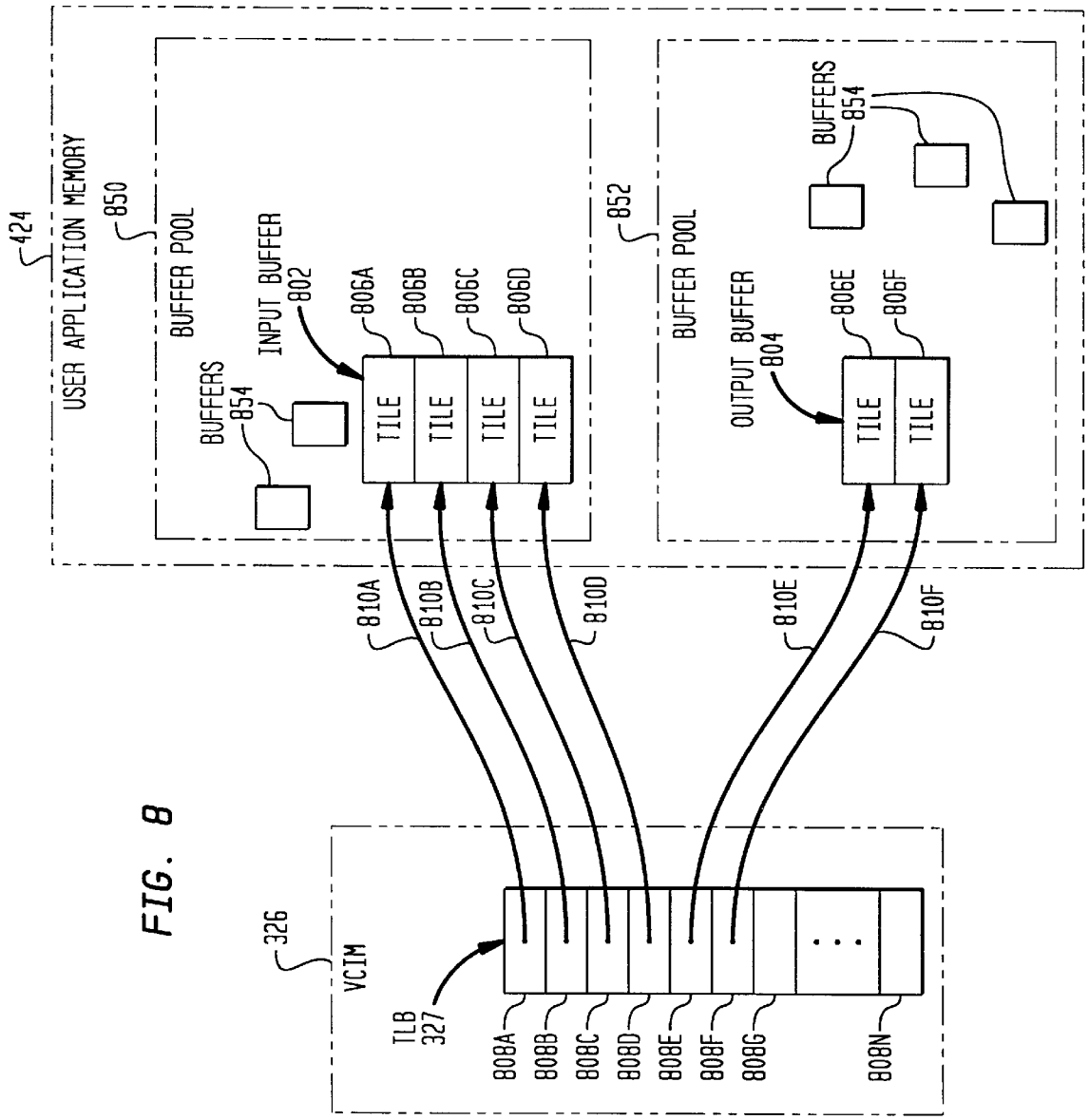
FIG. 8 illustrates the interaction of the TLB of the VICM and system memory tiles.

Referring to FIG. 8, the TLB 327 includes N entries, where N is preferably equal to 128 (although other values for N are possible). Each entry includes a pointer that addresses a tile in system memory 306. As noted above, each tile is preferably 64 Kbytes. Thus, the TLB 327 addresses up to 8 Mbytes of system memory 306. This 8 Mbyte portion of system memory 306 represents virtual local memory 1812 established by the operating system 406 for use by the VICM 326 (see FIG. 18) on a per converter context basis.

The TLB 327 is described in greater detail below.

Note in FIG. 8 that buffer pool 850 includes the input buffer 802 and other buffers 854. Similarly, buffer pool 852 includes the output buffer 804 and other buffers 854. A converter context may, in one instance, be processing the data in the input buffer 802. At the next instance, the converter context may be processing the data in one of the other buffers 854. Thus, it is possible to cycle through and use different areas of system memory 306 by accessing different DM buffers.

Operation of the Present Invention

The operation of the present invention shall now be described by describing three paths through the computer system 302. The first path is one from the video source 318 to the storage device 322. The second path is one from the storage device 322 to the graphics monitor 312. The third path is one from the storage device 322 to a video sink 316. These three paths encompass the primary functionality and operation of the present invention. Any additional functionality and operation of the present invention will be apparent to persons skilled in the relevant art(s) based on this discussion.

Scenario 1: Path from Video Source to Storage Device

Figure 9:
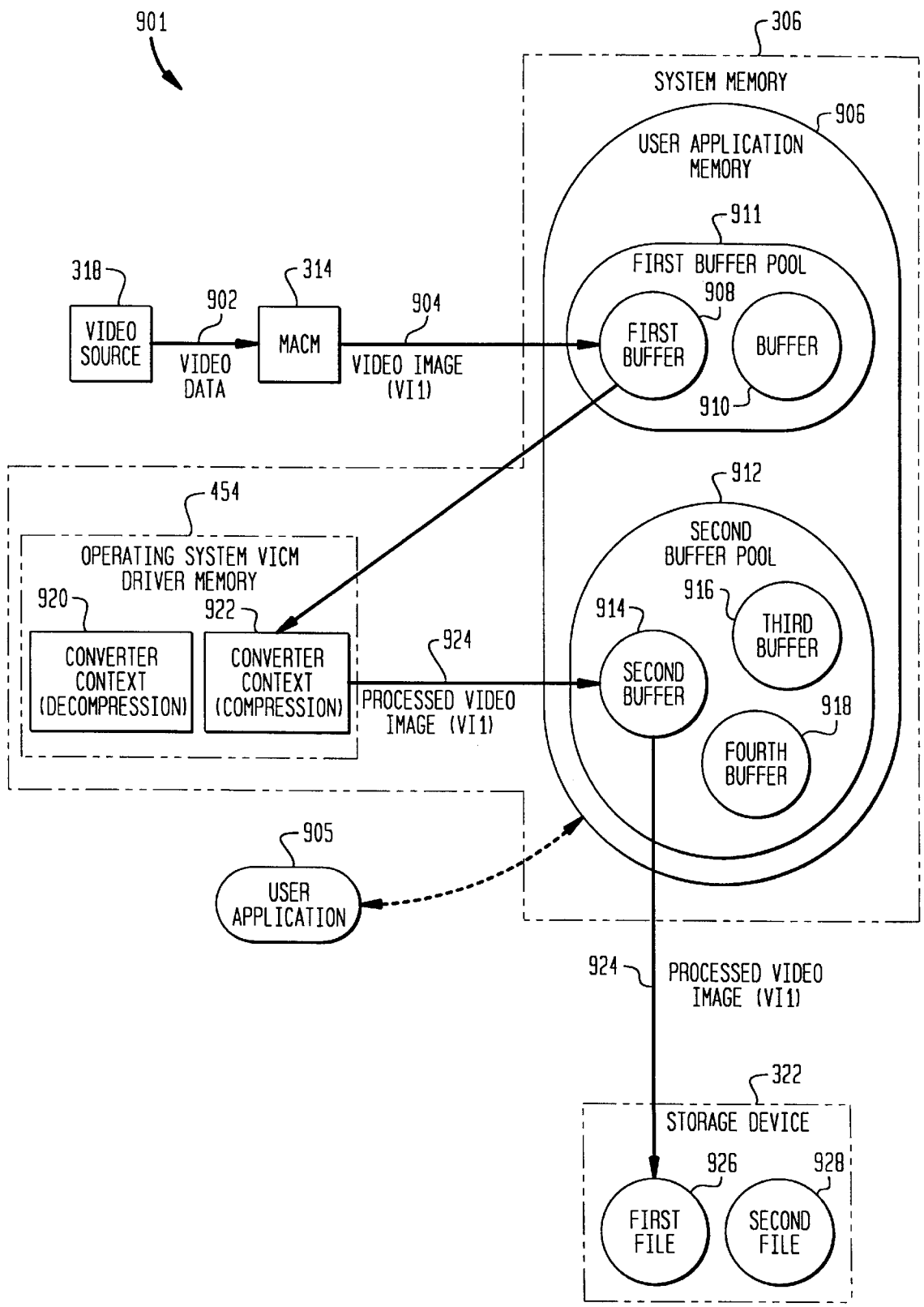
FIG. 9 shows a path from a video source to a storage device of the computer system shown in FIG. 3.
Figure 10:
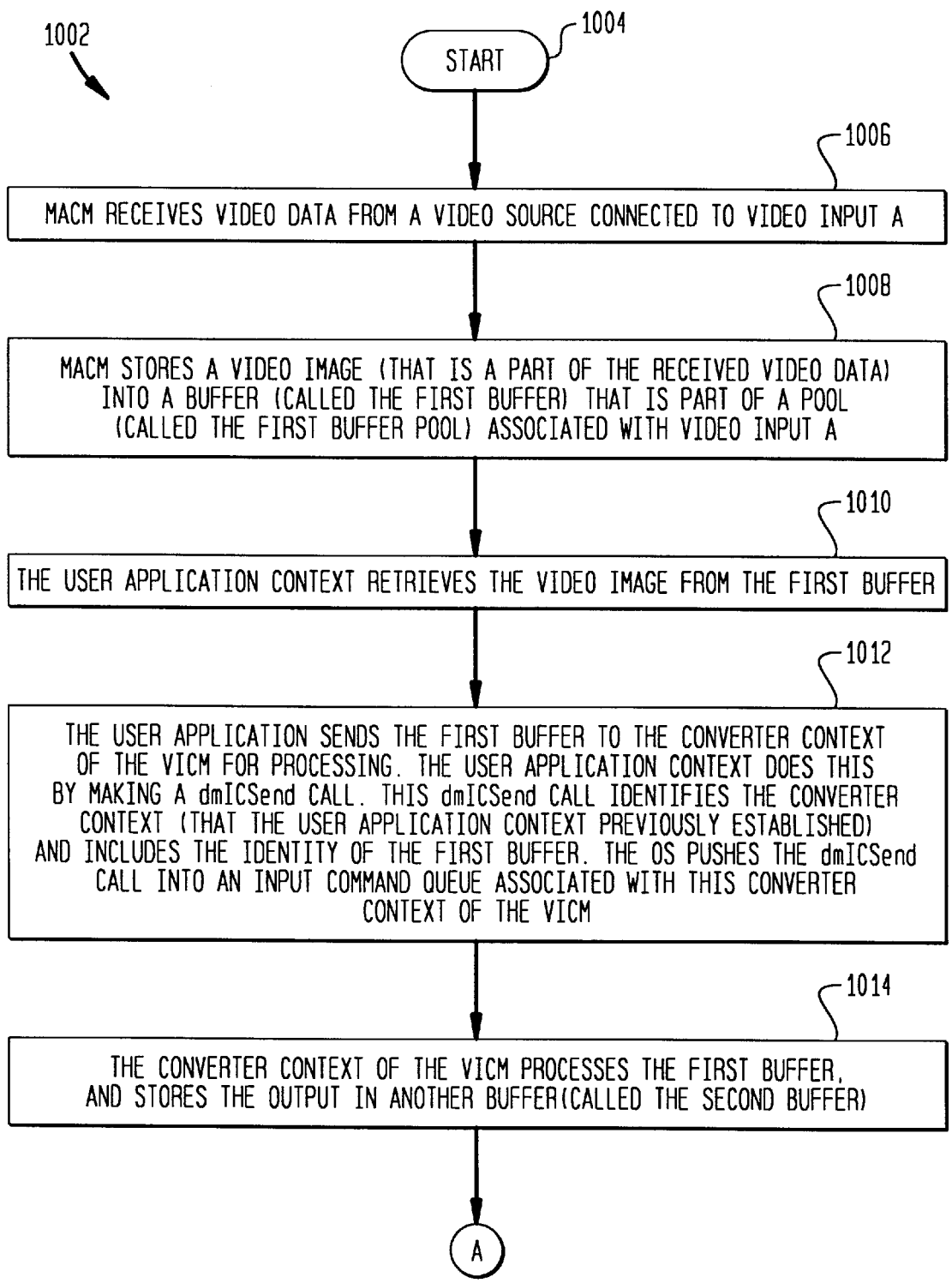

FIG. 9 illustrates a path from the video source 318 to the storage device 322. The operation of the invention while traversing this path is represented by a flowchart 1002 shown in FIGS. 10 and 11. Prior to the performance of flowchart 1002, assume that a user application 905 created a user application memory 906 having a first buffer pool 911 and a second buffer pool 912. The user application 905 also established a decompression converter context 920 and a compression converter context 922 in the operating system VICM driver memory 454. The user application 905 further associated the first buffer pool 911 with video input A of the MACM 314. Flowchart 1002 begins with step 1004, where control immediately passes to step 1006.

In step 1006, the MACM 314 receives video data 902 from the video source 318 that is connected to video input A.

In step 1008, the MACM 314 stores a video image 904 (that is a part of the received video data 902) into a buffer 908 (called the first buffer 908) that is part of the first buffer pool 911 that is linked to video input A.

Figure 12:
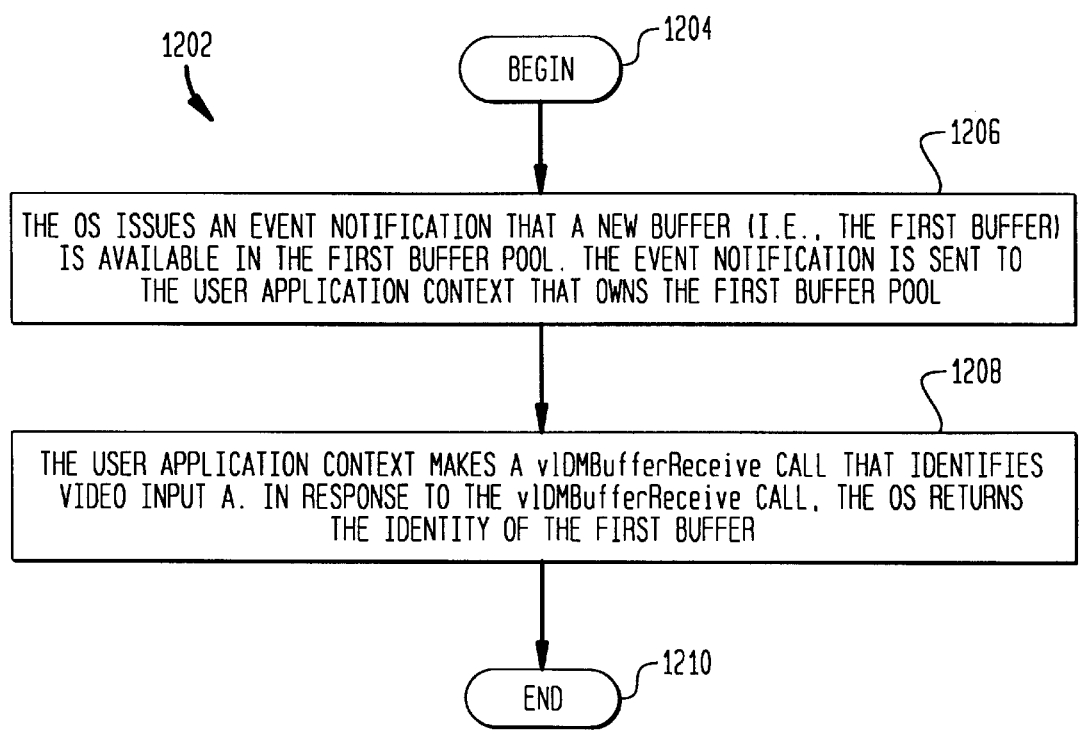

In step 1010, the user application 905 retrieves the video image 904 from the first buffer 908. The manner in which step 1010 is performed is represented by a flowchart 1202 shown in FIG. 12.

In step 1206, after the MACM 314 stores the video image 904 in the first buffer 908, the operating system 406 issues an event notification that a new buffer (i.e., the first buffer 908) is available in the first buffer pool 911. The event notification is sent to the user application 905 since it owns the first buffer pool 911. In step 1208, the user application 905 makes a vlDMBufferReceive call. This call is part of the video library 1822.

The vlDMBufferReceive call includes a passed parameter that identifies video input A. In response to the vlDMBufferReceive call, the operating system 406 returns the identity of the first buffer 908. This identity may be any means for identifying the first buffer 908, such as a label that has associated with it the addresses of system memory tiles in which the first buffer 908 is stored. The user application 905 is considered as having retrieved the first buffer 908 after it receives the identifier from the operating system 406.

Referring again to FIG. 10, in step 1012 the user application 905 sends the first buffer 908 to a converter context 920, 922 for processing. Assume that the user application 905 wishes to compress the video image 904 in the first buffer 908. In this case, the user application 905 sends the first buffer 908 to the compression converter context 922 for compression.

The user application 905 performs step 1012 by making a dmICSend call. This dmICSend call includes passed parameters that identify (1) the converter context 922, and (2) the identity of the first buffer 908. The operating system 406 pushes the dmICSend call (or a message that encapsulates the dmICSend call) into the input command queue 706 associated with this converter context 922.

As described below, this dmICSend call will result in the converter context 922 compressing the data in the first buffer 908. The user application 905 can also simultaneously send the first buffer 908 to other modules for processing. For example, the user application 905 could also send the first buffer 908 to the CRIMM 308 for display of the graphics data on the graphics monitor 312 (this is described below). The user application 905 could also send the first buffer 908 to another converter context of the VICM 326 for other types of image conversion processing.

The user application 905 could also send the first buffer 908 to the graphics rendering portion of the CRIMM 308. By sending the first buffer 908 to particular contexts of the CRIMM 308, the user application 905 can have various graphical rendering operations done on the data in the first buffer 908, such as operations involving blue screen, computer generated animations, overlays, 2D or 3D objects, text, titles, and any other well known graphical rendering operations. Thus, according to the present invention, user applications can direct and control the performance of graphical rendering operations on real-time video data.

The operations described above could occur simultaneously, or in any order. Such potential operation illustrates the flexibility and power that results when user applications are given the ability to participate in and control/direct/manipulate processing that was previously reserved to the hardware and/or operating system.

Figure 13:
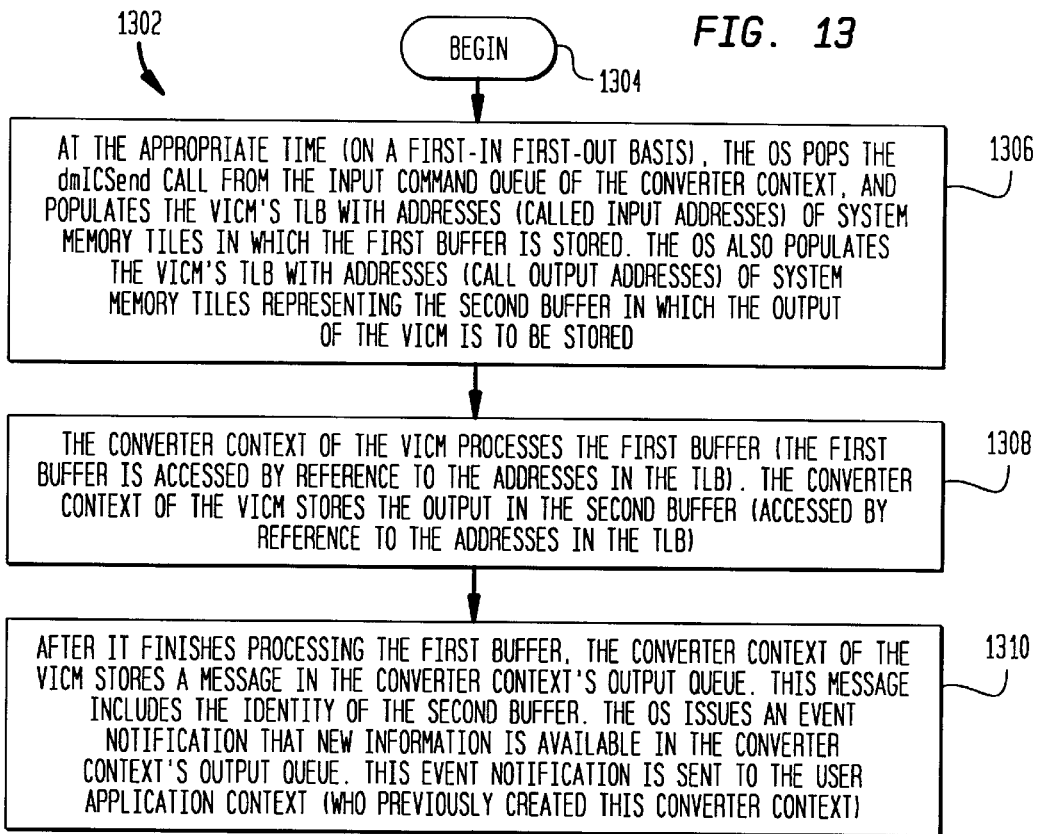

In step 1014, the converter context 922 processes the first buffer 908, and stores the output in another buffer 914 (called the second buffer 914). The manner in which step 1014 is performed is represented by a flowchart 1302 shown in FIG. 13.

In step 1306, at the appropriate time (preferably on a first-in first-out basis), the operating system 406 pops the dmICSend call from the input command queue 706 of the converter context 922. Then, the operating system 406 populates the VICM's TLB 327 with addresses (called input addresses) of system memory tiles in which the first buffer 908 is stored. The operating system also populates the VICM's TLB 327 with addresses (call output addresses) of system memory tiles representing the second buffer 914 in which the output of the converter context 922 is to be stored. (The operating system 406 may populate the logical TLB 701 first, and then transfer the contents of the logical TLB 701 to the physical TLB 327 when the converter context becomes active).

Figure 14:
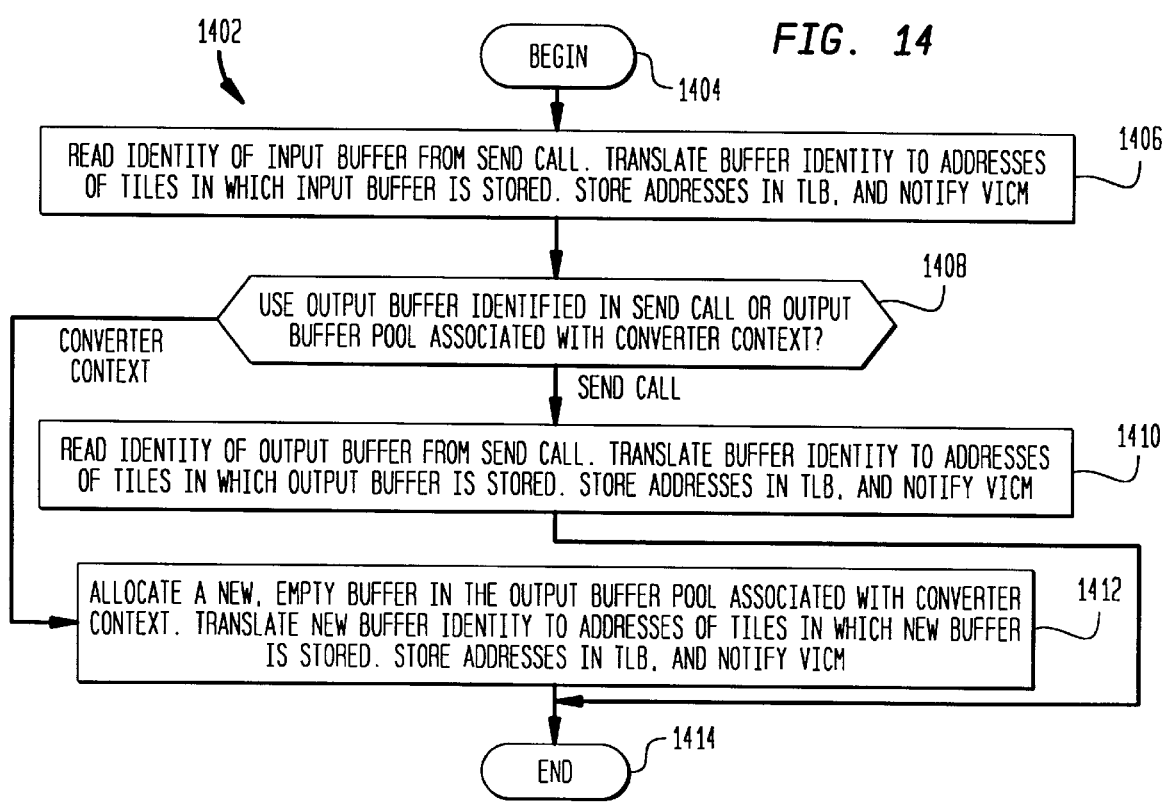

The manner in which the operating system 406 populates the TLB 327 is represented by a flowchart 1402 contained in FIG. 14. In step 1406, the operating system 406 reads the identity of the first buffer 908 (i.e., the input buffer) from the dmICSend call. The operating system 406 translates this buffer identity to addresses (called input addresses) of tiles in which the first buffer 908 is stored. In one embodiment, the operating system 406 maintains a table that cross references buffer identities to system memory tiles in which the associated buffers are stored. The operating system 406 stores these input addresses in entries (called input entries) of the TLB 327. The operating system 406 also informs the VICM 326 that the input buffer 908 (i.e., the first buffer 908) for processing the dmICSend call is in the tiles referenced by the input addresses stored in these TLB input entries.

In step 1408, the operating system 406 determines whether the converter context 922 is configured to have its output stored in an output buffer identified in dmICSend call, or in an output buffer pool associated with converter context 922. Previously, as part of creation of the converter context 922, the user application 905 elected (1) to store output from the converter context 922 in an output buffer identified in each dmICSend call; or (2) to store output from the converter context 922 in an output buffer pool associated with converter context 922. (The user application 905 made this election during step 510 of FIG. 5).

If the user application 905 elected to have output stored in an output buffer identified in each dmICSend call, then prior to making the dmICSend call the user application 905 allocated a new, empty buffer, and then passed the identity of this buffer as a passed parameter in the dmICSend call. If, instead, the user application 905 elected to have output stored in an output buffer pool associated with converter context 922, then prior to making the dmICSend call the user application 905 created this buffer pool and identified it to the converter context 922.

FIG. 7 illustrates an example where the user application 905 has elected to have converter context output stored in an output buffer pool 610 associated with converter context 704A. In an alternate embodiment, output from the converter context 704A is stored in the output buffer pool 610 only if an output buffer is not specified in the dmICSend call.

If it is determined in step 1408 that the converter context 922 is configured to have its output stored in an output buffer identified in the dmICSend call, then step 1410 is performed. Otherwise, step 1412 is performed.

In step 1410, the operating system 406 reads the identity of the output buffer (i.e., the second buffer 914) from the dmICSend call. The operating system 406 translates this buffer identity to addresses (called output addresses) of memory system tiles in which the second buffer 914 is stored. The operating system 406 stores these output addresses in entries (called output entries) of the TLB 327. The operating system 406 also informs the VICM 326 that the output buffer 914 (i.e., the second buffer 914) for storing the output of the converter context 922 is in the tiles referenced by the output addresses stored in these TLB output entries.

Referring again to step 1408, if it is determined that the converter context 922 is configured to have its output stored in an output buffer pool associated with the converter context 922, then step 1412 is performed. In step 1412, the operating system 406 allocates a new, empty buffer (i.e., the second buffer 914) in the output buffer pool associated with converter context 922. The identity of the second buffer 914 is returned to the operating system 406. Assume that this output buffer pool is the second buffer pool 912. The operating system 406 translates the identity of the second buffer 914 to addresses (called output addresses) of tiles in which the second buffer 914 is stored. The operating system 406 stores these output addresses in entries (called output entries) of the TLB 327. The operating system 406 also informs the VICM 326 that the output buffer 914 (i.e., the second buffer 914) for storing the output of the converter context 922 is in the tiles referenced by the output addresses stored in these TLB output entries.

Referring again to FIG. 13, in step 1308 the converter context 922 processes the first buffer 908 (the first buffer 908 is accessed by reference to the input addresses in the TLB 327). In particular, the converter context 922 performs its defined operation 710 (compression) on the data in the first buffer 908. The converter context 922 stores the output of such processing in the second buffer 914 (accessed by reference to the output addresses in the TLB 327).

In step 1310, after it finishes processing the first buffer 908 and storing the output in the second buffer 914, the converter context 922 stores a message in the converter context 922's output queue 708. This message includes the identity of the second buffer 914 (i.e., the place where the output was stored). The operating system 406 issues an event notification that new information is available in the converter context 922's output queue 708. This event notification is sent to the user application 905 since it originally created the converter context 922.

Figure 11:
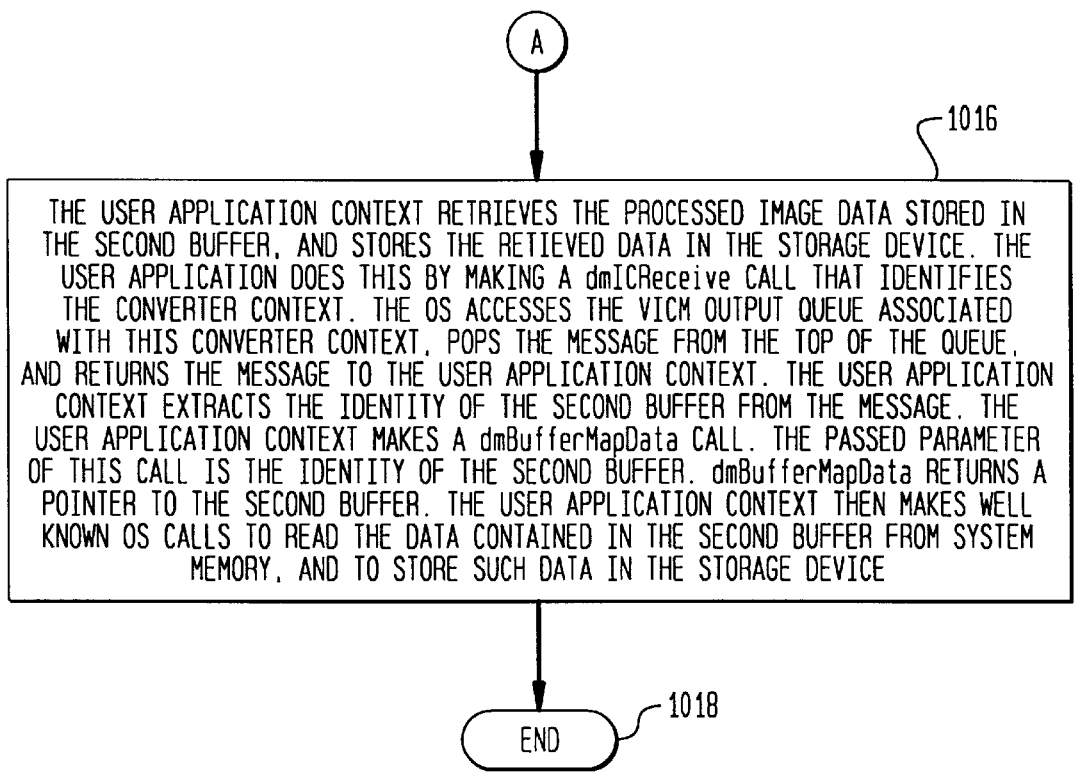

Referring again to the flowchart 1002 in FIG. 11, in step 1016 the user application 905 retrieves the processed image data 924 stored in the second buffer 914, and stores the retrieved data in a first file 926 in the storage device 322. The user application 905 does this by making a dmICReceive call.

The dmICReceive call, which is part of the image conversion library 1820, includes a passed parameter that identifies the converter context 922. The operating system accesses the converter context output queue 708 associated with this converter context 922, pops the message from the top of the output queue 708, and returns the message to the user application 905.

The user application 905 extracts the identity of the second buffer 914 from the message. The user application 905 makes a dmBufferMapData call, which is part of the operating system DM buffer facility 1890. The passed parameter of this call is the identity of the second buffer 914. dmBufferMapData returns a pointer to the second buffer 914.

The user application 905 then makes well known operating system calls to read the data contained in the second buffer 914 from system memory 306, and to store such data in the first file 926 of the storage device 322. Operation of flowchart 1002 is complete after step 1016 is performed, as indicated by step 1018.

Scenario 2: Path from Storage Device to Graphics Monitor

Figure 15:
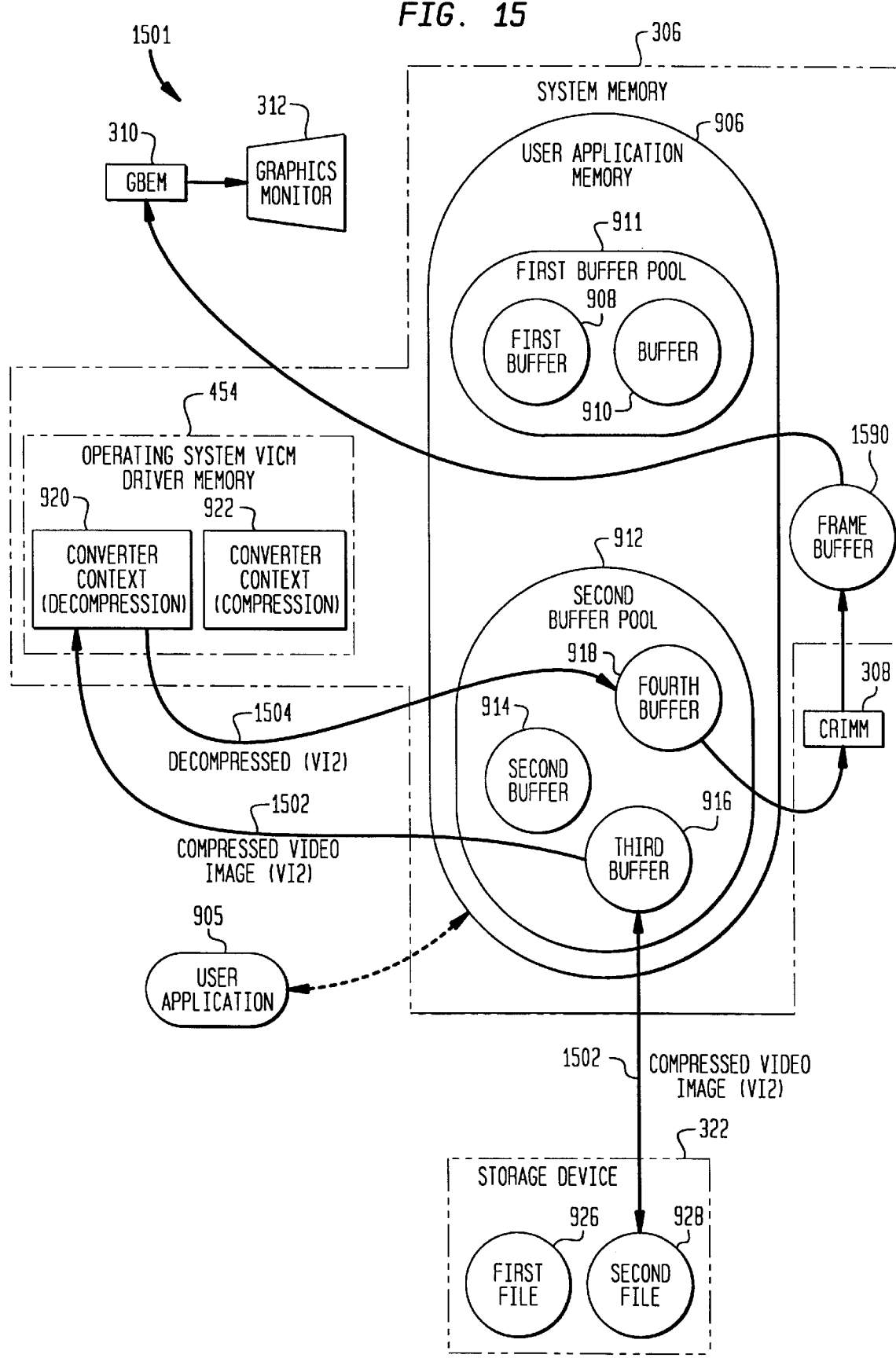
FIG. 15 shows a path from a storage device to a GBEM of the computer system shown in FIG. 3.

FIG. 15 illustrates a path from the storage device 322 to the graphics monitor 312. The operation of the invention while traversing this path is represented by a flowchart 1602 shown in FIG. 16. Prior to the performance of flowchart 1602, assume that the user application 905 created in its user application memory 906 a first buffer pool 911 and a second buffer pool 912. The user application 905 also established a decompression converter context 920 and a compression converter context 922. Flowchart 1602 begins with step 1604, where control immediately passes to step 1606.

In step 1606, the user application 905 retrieves a compressed video image 1502 from a second file 928 in the storage device 322 using normal and well known operating system calls. The user application 905 creates a new, empty buffer (called the third buffer 916) by making a dmBufferAllocate call, which returns the identity of the third buffer 916. The dmBufferAllocate call is part of the DM buffer operating system facility 1890.

The user application 905 makes a dmBufferMapData call, which is also part of the DM buffer operating system facility 1890. The passed parameter of this call is the identity of the third buffer 916. dmBufferMapData returns a pointer to the third buffer 916. The user application 905 then makes well known operating system calls to store the data 1502 retrieved from the storage device 322 in the third buffer 916.

In step 1608, the user application 905 sends the third buffer 916 to the decompression converter context 920 of the VICM 326 for processing. The user application 905 does this by making a dmICSend call. This dmICSend call has passed parameters that identify the decompression converter context 920 and the identity of the third buffer 916. The operating system 406 pushes the dmICSend call into the input command queue 706 associated with this converter context 920.

In step 1610, the converter context 920 decompresses the compressed image 1502 in the third buffer 916. The converter context 920 stores the result in a fourth buffer 918. Note that the third buffer 916 (the input buffer) and the fourth buffer 918 (the output buffer) are in the same buffer pool 912. In the scenario described previously, the two were in different buffer pools 911, 912. This is another example of the flexibility of the invention.

Figure 17:
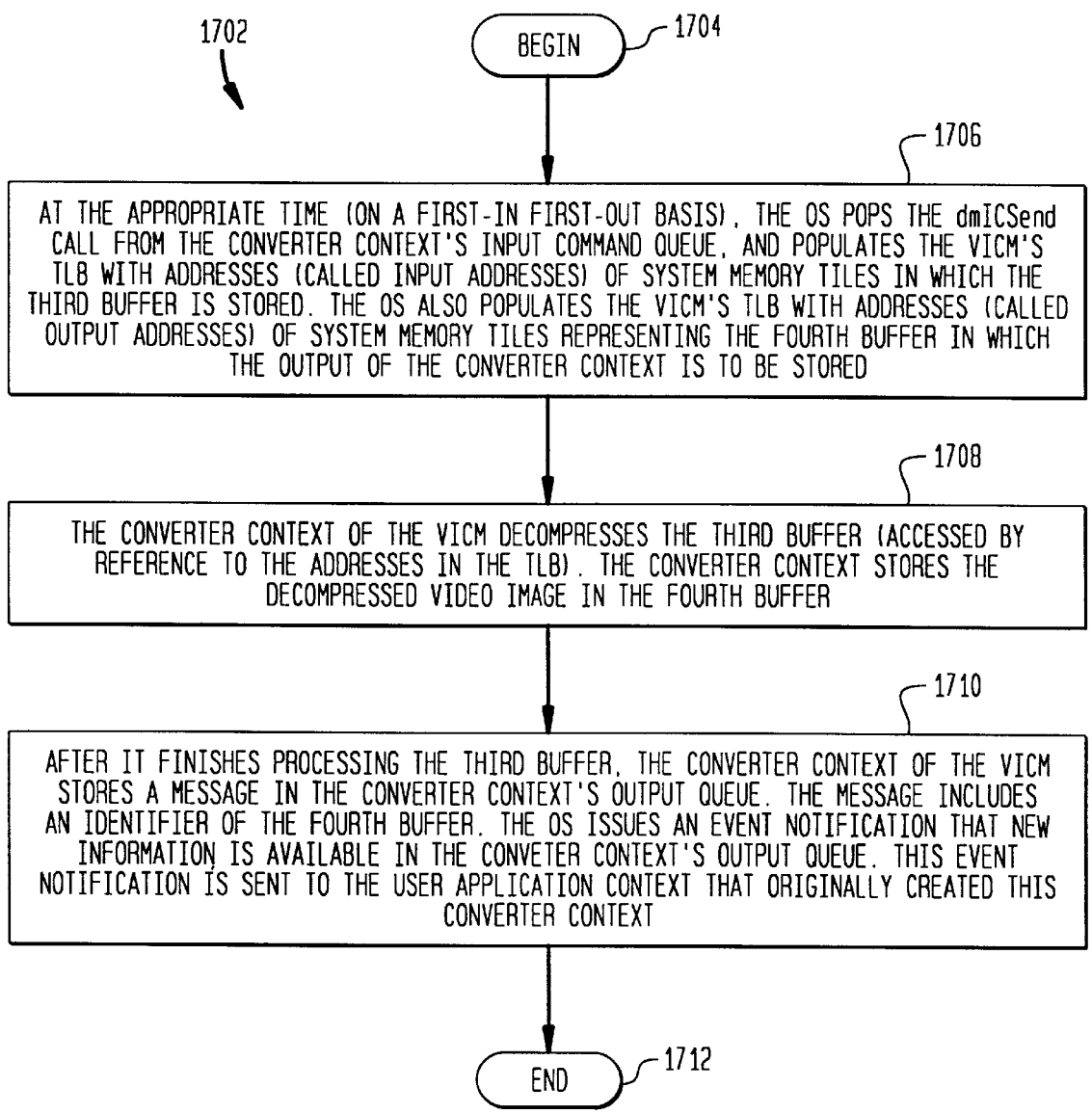

The manner in which step 1610 is performed is represented by a flowchart 1327 in FIG. 17. In step 1706, at the appropriate time (preferably on a first-in first-out basis), the operating system 406 pops the dmICSend call from the converter context 920's input command queue 706, and populates the VICM 326's TLB 327 with addresses (called input addresses) of system memory tiles in which the third buffer 916 is stored. The operating system 406 also populates the TLB 327 with addresses (called output addresses) of system memory tiles representing the fourth buffer 918 in which the output of the converter context 920 is to be stored. The manner in which the TLB 327 is populated is described above.

In step 1708, the converter context 920 decompresses the compressed data 1502 in the third buffer 916 (accessed by reference to the addresses in the TLB). The converter context 920 stores the decompressed video image 1504 in the fourth buffer 918 (accessed by reference to the addresses in the TLB).

In step 1710, after it finishes processing the third buffer 916 and storing the output in the fourth buffer 918, the converter context 920 stores a message in the converter context 920's output queue 708. The message includes an identifier of the fourth buffer 918. The operating system 406 issues an event notification that new information is available in the converter context 920's output queue 708. This event notification is sent to the user application 905 since it originally created the converter context 920.

Referring again to FIG. 16, in step 1612 the user application 905 retrieves the information from the fourth buffer 918, and displays the information on the graphics monitor 312. The user application 905 does this by first making a dmICReceive call (that is part of the image conversion library 1820) that includes a passed parameter that identifies the converter context 920. In response to the dmICReceive call, the operating system 406 accesses the converter context 920's output queue 708, pops the message from the top of the output queue 708, and returns the message to the user application 905.

The user application 905 extracts the identity of the fourth buffer 918 from the message. The user application 905 makes a dmBufferMapData call. The passed parameter of this call is the identity of the fourth buffer 918. dmBufferMapData returns a pointer to the fourth buffer 918.

The user application 905 then makes a glDrawPixels call. The passed parameter of this call is the pointer to the fourth buffer 308. In response to the glDrawPixels call, the graphics renderer in the CRIMM 308 performs any necessary well known processing on the data in the fourth buffer 918, and stores the processed data in the frame buffer 1590 formed in system memory 306. The GBEM 310 displays the contents of the frame buffer 1590 on the graphics display 312.

The operation of flowchart 1602 is complete after step 1612 is performed, as indicated by step 1614.

Scenario 3: Path from Storage Device to Video Output/Sink

Figure 16:
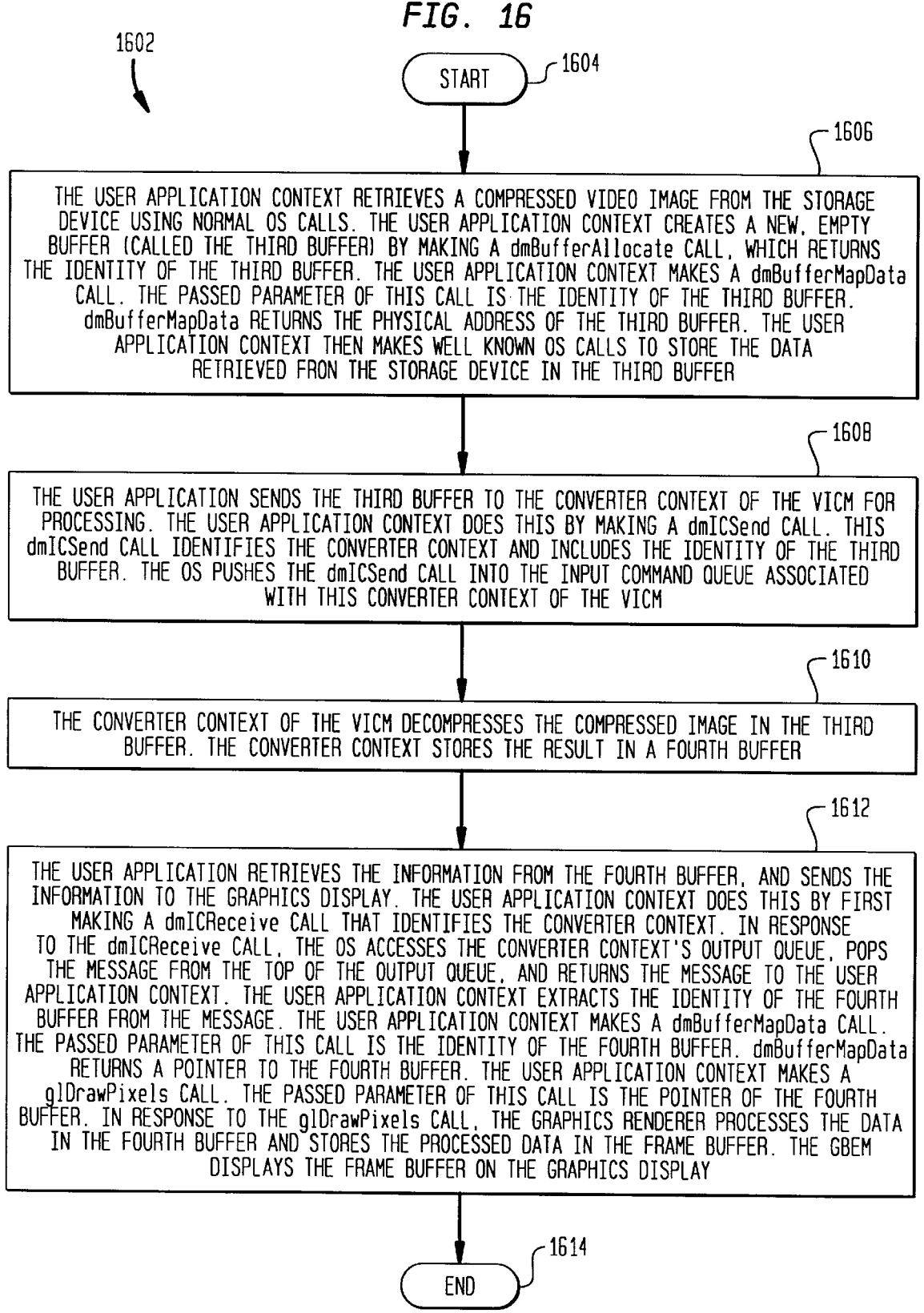

FIG. 15 shall be used again to describe a path from the storage device 322 to a video output/sink 316 (assume that the steps of flowchart 1602 in FIG. 16 were not performed). Previously, preferably during initialization, the user application 905 created a device context of the video output. The video output device context is a logical representation of the video output. In one embodiment, multiple user applications may work with the same video output via their respective video output device contexts. In another embodiment, video outputs are not simultaneously shared by user applications.

The operation of the invention while traversing the path of the third scenario is represented by a flowchart 1902 shown in FIG. 19. Flowchart 1902 begins with step 1904, where control immediately passes to step 1906.

In step 1906, the user application 905 retrieves a compressed video image 1502 from the second file 928 in the storage device 322 using normal and well known operating system calls. The user application 905 creates a new, empty buffer (called the third buffer 916) by making a dmBufferAllocate call, which returns the identity of the third buffer 916. The dmBufferAllocate call is part of the DM buffer operating system facility 1890.

The user application 905 makes a dmBufferMapData call, which is also part of the DM buffer operating system facility 1890. The passed parameter of this call is the identity of the third buffer 916. dmBufferMapData returns a pointer to the third buffer 916. The user application 905 then makes well known operating system calls to store the data 1502 retrieved from the storage device 322 in the third buffer 916.

In step 1908, the user application 905 sends the third buffer 916 to the decompression converter context 920 of the VICM 326 for processing. The user application 905 does this by making a dmICSend call. This dmICSend call has passed parameters that identify the decompression converter context 920 and the identity of the third buffer 916. The operating system 406 pushes the dmICSend call into the input command queue 706 associated with this converter context 920.

In step 1910, the converter context 920 decompresses the compressed image 1502 in the third buffer 916. The converter context 920 stores the result in a fourth buffer 918.

In step 1912, the user application 905 retrieves the information from the fourth buffer 918, and passes the information to the video output (not shown in FIG. 15). The user application 905 does this by first making a dmICReceive call (that is part of the image conversion library 1820) that includes a passed parameter that identifies the converter context 920. In response to the dmICReceive call, the operating system 406 accesses the converter context 920's output queue 708, pops the message from the top of the output queue 708, and returns the message to the user application 905. The user application 905 extracts the identity of the fourth buffer 918 from the message.

Then, the user application 905 makes a vlDMBufferSend call which identifies the device context of the video output associated with the user application 905. The parameter of this call is the identity of the fourth buffer. As a result of the vlDMBufferSend call, the operating system 406 enqueues the data from the fourth buffer to a data queue (not shown) associated with the device context of the video output. The device context of the video output then reads the data from the data queue in its normal manner, and processes the data. Such processing may include converting the data into a video signal, and displaying the video signal.

The operation of flowchart 1902 is complete after step 1912 is performed, as indicated by step 1914.

Note that the MACM 314 can receive video signals of any type, and store image data from those video signals in DM buffers in system memory 306. User applications can be programmed to process any type of video signals. The converter contexts of the VICM 326 can process any type of video signals. For example, a compression converter context can compress whatever data is in a buffer, irrespective of the video type that is represented by such data. Thus, the present invention is very flexible because it can process any video type.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for processing video images, comprising the steps of:
   (1) receiving real-time video data comprising a video image;
   (2) storing said video image in a first buffer of a system memory;
   (3) enabling a user application to direct manipulation of said video image stored in said first buffer; and
   (4) storing results of said manipulation in a second buffer of the system memory.

2. The method of claim 1, wherein step (3) comprises:
   enabling said user application to control input and output processing of said real-time video data.

3. The method of claim 1, wherein step (3) comprises:
   enabling said user application to control image conversion processing of said video image in said first buffer.

4. The method of claim 1, wherein step (3) comprises:
   enabling said user application to control graphics rendering processing of said video image in said first buffer.

5. The method of claim 1, wherein step (3) comprises:
   (a) enabling said user application to cause one or more input/output operations to be performed on said video image in said first buffer;
   (b) enabling said user application to cause one or more image conversion operations to be performed on said video image in said first buffer; and
   (c) enabling said user application to cause one or more graphics rendering operations to be performed on said video image in said first buffer;
   wherein any combination of steps (a), (b), and (c) is performed simultaneously.

6. A computer system, comprising:
   a system memory;
   a multimedia access and control module (MACM), comprising:
      means for receiving real-time video data comprising a video image;
      means for storing said video image in a first buffer contained in a first buffer pool of said system memory, said first buffer pool having been created by a user application;
   a converter context of a video imaging and compression module (VICM), comprising:
      means for performing an image conversion operation on said video image stored in said first buffer, said image conversion operation having been directed by said user application;
      means for storing results of said image conversion operation in a second buffer contained in a second buffer pool of said system memory, said second buffer pool having been created by said user application.

7. A computer system, comprising:
   a system memory;
   a multimedia access and control module (MACM);
   a user application; and
   a user application memory in said system memory, said user application memory being used by said user application, said user application memory including a plurality of buffers, a pool of said buffers being associated with said MACM, wherein said MACM stores received real-time video image data in buffers of said buffer pool.

8. The system of claim 7, further comprising:
   means for enabling said user application to control input and output processing of said real-time video data.

9. The system of claim 7, further comprising:
   means for enabling said user application to control image conversion processing of said real-time video data.

10. The system of claim 7, further comprising:
    means for enabling said user application to control graphics rendering processing of said real-time video data.

11. A method of initializing a user application in a computer system, comprising:
    (1) establishing a user application memory in a system memory, said user application memory being for use by said user application;
    (2) associating a pool of buffers in said user application memory with a multimedia access and control module (MACM), wherein said MACM stores received real-time video data in buffers of said buffer pool; and
    (3) establishing one or more converter contexts of a video imaging and compression module (VICM), wherein each converter context is capable at the direction of the user application of performing an image conversion operation on real-time video data stored in buffers of said user application memory, and is also capable at the direction of the user application of storing results of said image conversion operation in buffers of said user application memory.

12. The method of claim 11, further comprising the step of:
    (4) enabling the user application to control input and output processing of said real-time video data.

13. The method of claim 11, further comprising the step of:
    (4) enabling the user application to control graphics rendering processing of said real-time video data.

14. A video imaging and compression module (VICM), comprising:
    a translation lookaside buffer (TLB) comprising a plurality of entries, each entry capable of storing a pointer to a tile in a system memory;
    at least one converter context capable of performing an image conversion operation, said at least one converter context comprising:
       an input command queue having stored therein a first message identifying a first buffer in said system memory, addresses to tiles in which said first buffer is stored having been placed into input entries of said TLB;
       means for performing said image conversion operation on video image data stored in said first buffer as referenced by said tile addresses in said TLB input entries;

means for storing results of said image conversion operation in a second buffer in said system memory, addresses to tiles in which said second buffer is stored having been placed into output entries of said TLB;

an output queue; and means for storing a message in said output queue, said message storing an identifier of said second buffer.

15. A software system architecture in a computer system, comprising:

an operating system; and a plurality of software libraries logically situated between user applications executing in the computer system and said operating system, comprising:

a video library having means for enabling the user applications to control storage and retrieval of real-time video data, received by a multimedia access and control module (MACM), in buffers of a system memory; and an image conversion library having means for enabling the user applications to cause converter contexts of a video imaging and compression module (VICM) to perform image conversion operations on real-time video data stored in buffers of said system memory, and to control storage of results of said image conversion operations in buffers of said system memory.

* * * * *